(12) United States Patent
Pamucci

(10) Patent No.: US 11,770,260 B1
(45) Date of Patent: Sep. 26, 2023

(54) DETERMINING AUTHENTICITY OF DIGITAL CONTENT

(71) Applicant: Amazon Technologies, Inc., Seattle, WA (US)

(72) Inventor: Roman Pamucci, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/368,685

(22) Filed: Mar. 28, 2019

(51) Int. Cl.
| | |
|---|---|
| *H04L 29/06* | (2006.01) |
| *H04L 9/32* | (2006.01) |
| *H04L 9/30* | (2006.01) |
| *H04L 9/08* | (2006.01) |
| *H04N 19/46* | (2014.01) |
| *H04W 12/04* | (2021.01) |

(52) U.S. Cl.
CPC ............ *H04L 9/3247* (2013.01); *H04L 9/0894* (2013.01); *H04L 9/30* (2013.01); *H04L 9/3236* (2013.01); *H04L 2209/60* (2013.01); *H04N 19/46* (2014.11); *H04W 12/04* (2013.01)

(58) Field of Classification Search
CPC ........... G06F 21/00; H04L 9/00; H04W 12/00; H04L 9/30; H04L 9/3247; H04L 9/3236; H04L 9/0894; H04L 2209/60

See application file for complete search history.

(56) References Cited

U.S. PATENT DOCUMENTS

| | | | |
|---|---|---|---|
| 8,559,516 B2 | 10/2013 | Hardacker et al. | |
| 8,989,280 B2 | 3/2015 | Burt | |
| 8,989,376 B2 | 3/2015 | Ren et al. | |
| 9,418,297 B2 | 8/2016 | Hefeeda et al. | |

(Continued)

OTHER PUBLICATIONS

International Organization for Standardization/International Electrotechnical Commission, "Information technology - Trusted Platform Module - Part 2: Design principles," International Standard, ISO/IEC 11889-2(E), May. 15, 2009, 152 pages.
International Organization for Standardization/International Electrotechnical Commission, "Information technology - Trusted Platform Module - Part 4: Commands," International Standard, ISO/IEC 11889-4:2009(E), May. 15, 2009, 254 pages.

(Continued)

*Primary Examiner* — Joseph P Hirl
*Assistant Examiner* — Leynna Truvan
(74) *Attorney, Agent, or Firm* — Davis Wright Tremaine LLP

(57) ABSTRACT

A system, method, and computer readable medium for determining authenticity of digital content. The system includes obtaining a video including a plurality of intermediate video frames with respective digital signatures, each video frame of the plurality of intermediate video frames associated with a respective digital signature. The digital signature is generated based at least in part on the image content of the video frame and a hash value of a previous video frame in the same video. Based on using a cryptographic key associated with a recording device used to capture the video, the system can determine authenticity of the content and the ordering of the frames within a video.

20 Claims, 15 Drawing Sheets

(56) References Cited

U.S. PATENT DOCUMENTS

| | | | |
|---|---|---|---|
| 9,755,835 B2* | 9/2017 | Schneider et al. | ... H04L 9/3242 |
| 10,134,441 B2 | 11/2018 | Li et al. | |
| 10,939,269 B2 | 3/2021 | Turner | |
| 2004/0022444 A1* | 2/2004 | Rhoads | ............... G06K 9/222 |
| | | | 382/232 |
| 2004/0091111 A1* | 5/2004 | Levy et al. | ........ H04N 1/00323 |
| | | | 380/202 |
| 2011/0150269 A1* | 6/2011 | Yoshioka | ............. G06V 20/46 |
| | | | 382/100 |
| 2013/0259228 A1 | 10/2013 | Ren et al. | |
| 2013/0326573 A1* | 12/2013 | Sharon et al. | ......... H04H 60/73 |
| | | | 725/115 |
| 2014/0010366 A1 | 1/2014 | Quinn et al. | |
| 2014/0098954 A1 | 4/2014 | Keidar et al. | |
| 2015/0334339 A1 | 11/2015 | Dejene | |
| 2016/0286285 A1 | 9/2016 | Geyzel et al. | |
| 2018/0253567 A1 | 9/2018 | Gonzalez-Banos et al. | |
| 2018/0288362 A1 | 10/2018 | Altenburger et al. | |
| 2018/0322604 A1 | 11/2018 | Zhao et al. | |

OTHER PUBLICATIONS

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

International Organization for Standardization/ International Electrotechnical Commission, "Information technology - Trusted Platform Module - Part 1: Overview," International Standard, ISO/IEC 11889-1(E), May. 15, 2009, 20 pages.

International Organization for Standardization/International Electrotechnical Commission, "Information technology - Trusted Platform Module - Part 3: Structures," International Standard, ISO/IEC 11889-3:2009(E), May. 15, 2009, 204 pages.

* cited by examiner

US 11,770,260 B1

DETERMINING AUTHENTICITY OF DIGITAL CONTENT

CROSS-REFERENCE TO RELATED APPLICATIONS

This application incorporates by reference for all purposes the full disclosure of co-pending U.S. Pat. Application No. 16/368,710, now U.S. Pat. No. 11,449,584, issued Sep. 20, 2022, filed concurrently herewith, entitled "GENERATING AUTHENTICABLE DIGITAL CONTENT".

BACKGROUND

The field of realistic images and video synthesis is currently in the middle of a rapid development. Conventional technology is capable of transforming content through performing face geometry, gesture, and emotion transfer analysis, at which the transformed content cannot be easily distinguished from the original content recorded by devices. Such rapid development can be extended to video content, in which image objects appearing in video content can be edited in a manner that would appear as realistic as the actual footage recorded by video camera devices. Such content transformation can be processed with devices that are readily accessible to users. In cases of video streams, the transformation may not simply be limited to content but also the order in which such content is arranged as well as scenes of the content themselves being removed from the file.

Such developments, however, may open a possibility of generating transformed content that cannot be easily discerned by users. For example, certain segments of audio content can be removed in a manner making it difficult or impossible for a user to detect that the audio has been edited. Moreover, transformed content can be widely distributed to users across the Internet, which may unintentionally replace the actual content which may distort perception of users with regards to information indicated in such content. Accordingly, there is a challenge in which determining authenticity of content becomes increasingly difficult as transforming different types of content becomes more realistic.

BRIEF DESCRIPTION OF THE DRAWINGS

Various techniques will be described with reference to the drawings, in which.

DETAILED DESCRIPTION

Figure 1:
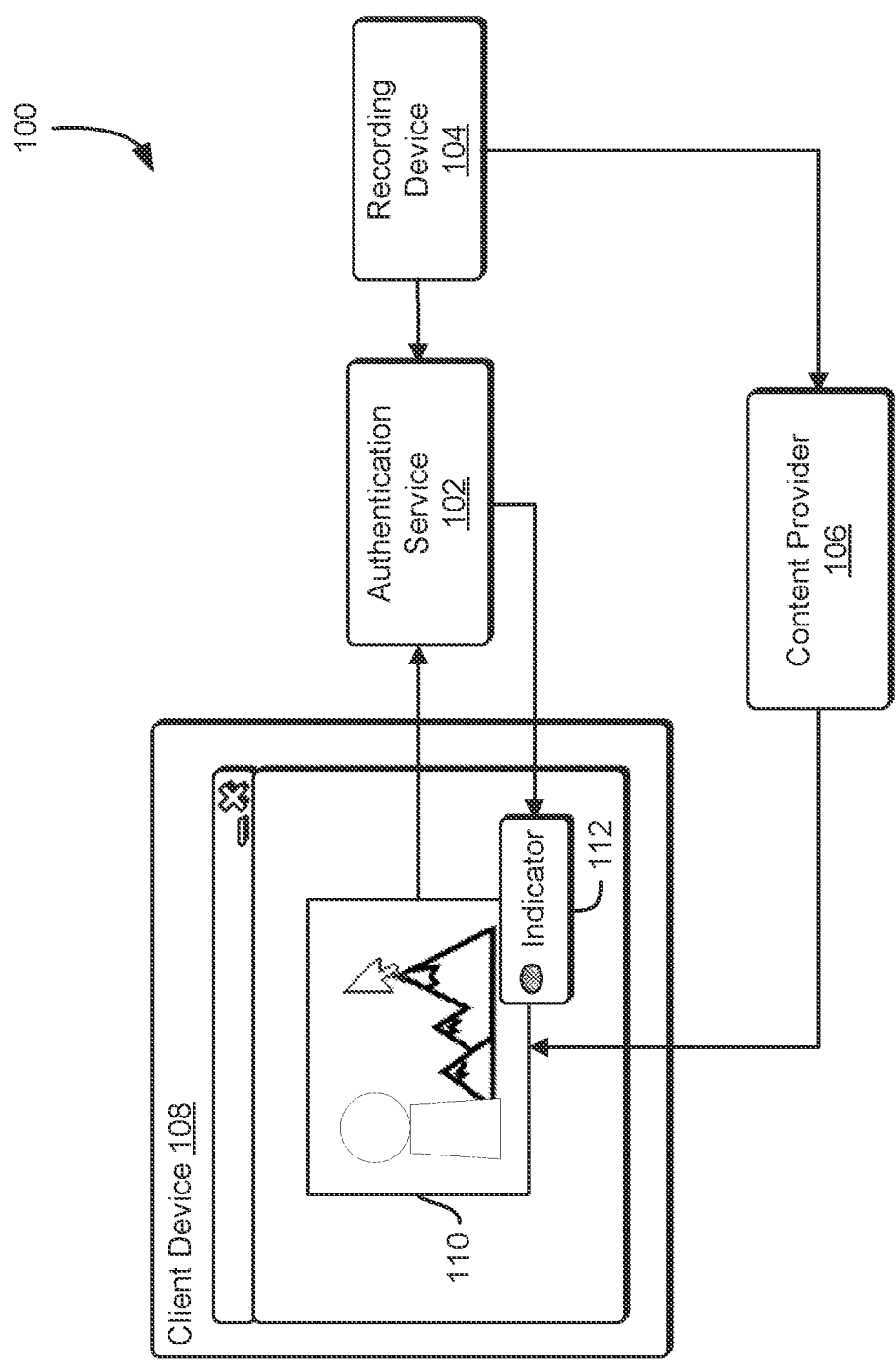
FIG. 1 shows an illustrative example of an environment in which content is authenticated in accordance with at least one embodiment.

This disclosure relates to determining authenticity of content, in which a service provider may authenticate that the content is an original, unaltered version. In some aspects, the authentication service can also determine that any modifications to the content can be verified by evaluating a set of non-repudiable claims provided in a manifest associated with the content. In this manner, the users can track the distributed content to ensure that distributed content provides accurate depiction of information or any changes can be readily verified and trusted.

Aspects of the present disclosure include a system and a process in which content, such as multimedia files that include image, video, and/or audio, is digitally signed at the moment of capture. The digital signature can be generated using cryptographic material (e.g., private cryptographic keys) stored in a secure module of the recording device used to capture the content. The cryptographic material may be loaded in a firmware associated with the recording device which prevents any tampering by users of the recording device or external devices attempting to access the content before the content is digitally signed. The digital signature can be generated by using asymmetric key algorithms, at which public cryptographic keys associated with the recording device can be published or otherwise distributed to authentication services that can later verify authenticity of the captured content. Once the content is digitally signed and authenticated, the content can be distributed across various communication channels and allows users to verify the accuracy of information depicted in the content by authenticating through its digital signature.

Aspects of the present disclosure also include a system and a process to determine authenticity of video content. For each frame associated with a video, a digital signature may be generated for authenticating the visual properties for the frame. In additional aspects, the digital signature may also be used to confirm that frames are correctly positioned within a video or detect when they are not, such as due to an attempt to rearrange frames to cause the video to portray a different sequence of events. Correct position of the frame within the video can be determined based on using a hash value of another frame as input when generating the digital signature. Multiple frames may be individually digitally signed, each with a hash of a previous frame, thereby forming a chain of frames where modification of the chain (e.g., by removing, adding, and/or rearranging frames) enables detection of modification of the corresponding video. As such, the digital signature of the aspects of the present disclosure can be used to indicate whether the content within the video is authentic as well as whether ordering of the frames have been rearranged or otherwise manipulated (e.g., adding new frames, deleting segments of the video).

Several aspects of the present disclosure additionally recognize that authentication of modified content through digital signatures can be difficult as hash of the modified content becomes different from the digital signature generated at the moment of content capture. In such cases, the full modification path of the transformed content can be stored in a manifest thus allowing authentication service or users to track the changes accumulated between the capture of the content and its later distribution. Every modification to the content may cause a manifest to store information indicating such change, including the version of the software used to modify the content and any input parameters used by the modification. The manifest may be metadata that can be embedded in the content file. Alternative to the manifest being embedded in the content file, the manifest may be a separate file from the content. By generating an updating a manifest that provides detailed information with regards to the distributed content, the authentication service can later verify authenticity of such content even when authentication through digital signatures becomes rather difficult.

In accordance with several aspects of the present disclosure, the authentication service may determine authenticity of modified content based at least in part on the information indicated in the associated manifest. Initially, the authentication service evaluates the manifest to obtain the original version of the content based at least in part on the recording device identifier indicated in the content. Once the original version of the content is obtained, the authentication service repeats one or more computing operations to the original content, as indicated by the information in the manifest. The computing operations may include using the same version of the software as provided in the manifest as well as applying one or more computer functions (with the indicated input parameters) that were previously used to produce the modified content. After the computing operations are applied to the original content, the modified content and the original content (applied with the operations) can be compared to determine authenticity of the modified content. The comparison may include pixel-to-pixel analysis of both contents. In addition the pixel-by-pixel analysis, the comparison may include generating hashes of both contents then comparing whether those two files match. In yet another aspect, the comparison include whether the two files are binary equivalents of each other. Consequently, the authentication service is capable of determining authenticity as to whether the distributed content is the same as the original version of the content, or, if modified, whether modifications that produced the distributed content can be authenticated.

As one skilled in the art will appreciate in light of this disclosure, certain embodiments may be capable of achieving certain advantages, including authentication of distributed multimedia content even when the content is modified in photorealistic manner. By identifying the modifications in the manifest, user can interact with the authentication service to determine as to whether such modifications in transformed content are accurate. Further, by digitally signing the multimedia content at the moment of the capture, security and integrity of content data can be improved, and manipulation of such data which may cause inaccurate information to be distributed to other users can be prevented. The aspects of the present disclosure thus improve the conventional technology of maintaining accuracy of data while allowing legitimate modifications to take place which can later be authenticated.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which content is authenticated in accordance with at least one embodiment. In several embodiments, the environment 100 includes authentication service 102, the recording device 104, content provider 106, client device 108, the content 110, and indicator 112. In several embodiments, the recording device may initially capture content (hereinafter referred to as "original content" or "original version of the content") then provide such original content to the authentication service 102. As referred to herein, content may be any type of data that may be captured by a recording device (e.g., recording device 104) and convey information through a device (e.g., client device 108). In several embodiments, content may include, but not limited to, text, graphics, audio, video and/or other content usable to be provided to the user, which may be served to the client device 108 by the web server of the content provider 106 (e.g., application server 1508 of FIG. 15) in the form of appropriate client-side structured language, such as HTML. Content 110 transferred to a client device 108 (e.g., client device 1502 of FIG. 15) may be processed by the client device 108 to provide the content 110 in one or more forms including, but not limited to, forms that are perceptible to the user audibly, visually and/or through other senses including touch, taste, and/or smell. In some embodiments, the original content may be associated with a digital signature which can later be used to authenticate content similar to the original content as well as a manifest which indicates one or more modifications that were applied to the original content, in which the original content with one or more modifications can be distributed to other devices. In some embodiments, the recording device 104 may also upload the original content, the digital signature, the manifest, and the recording device identifier to the authentication service 102 and/or a content provider 106. In the case of content being uploaded to the content provider 106, the content provider 106 can distribute the content to other devices, including the client device 108. As illustrated herein, the device 108 may cause the distributed content 110 (and often with other data) to be displayed on a user interface, including a window of a browser program.

As recognized by aspects of the present disclosure, there is a possibility that the distributed content 110 may not match the actual content as captured. For example, one or more objects of the original content may have been transformed, added, or removed. In another example, one or more audio segments of the original audio content may have been removed or edited. In yet another example, sensor readings of the original content may have been reduced so as to trigger different types of operations from devices that rely on such sensor readings. In cases where the content 110 is a video, original video can be further manipulated in which the frames of the video are rearranged or removed to alter the content intended to be conveyed by the video. To ensure that such changes to the content has not occurred or otherwise such changes can be validated as legitimate modifications of the original content, the client device 108 may submit an authentication request to the authentication service 102 which determines authenticity of the distributed content. In some embodiments, the authentication service 102 may process the request associated with the distributed content by validating a digital signature that is associated with the original content. If the content 110 is a video, the authentication service 102 may obtain a plurality of digital signatures, in which each digital signature may be associated with a respective frame of the video. These digital signatures can be used to authenticate the content as well as the ordering of the frames within the video. In embodiments where the manifest associated with the distributed content indicates one or more modifications applied to the original content, the authentication service 202 may obtain the original content, apply the one or more modifications as indicated by such manifest, and compare whether the original content with the modifications matches the distributed content. In either scenarios, the authentication service 102 may transmit a response back to the client device 108 whether the distributed content is authenticated. In some embodiments, the device 108 may in turn cause an indicator 112 to provide a visual or aural indication as to whether the distributed content is authenticated.

Figure 2:
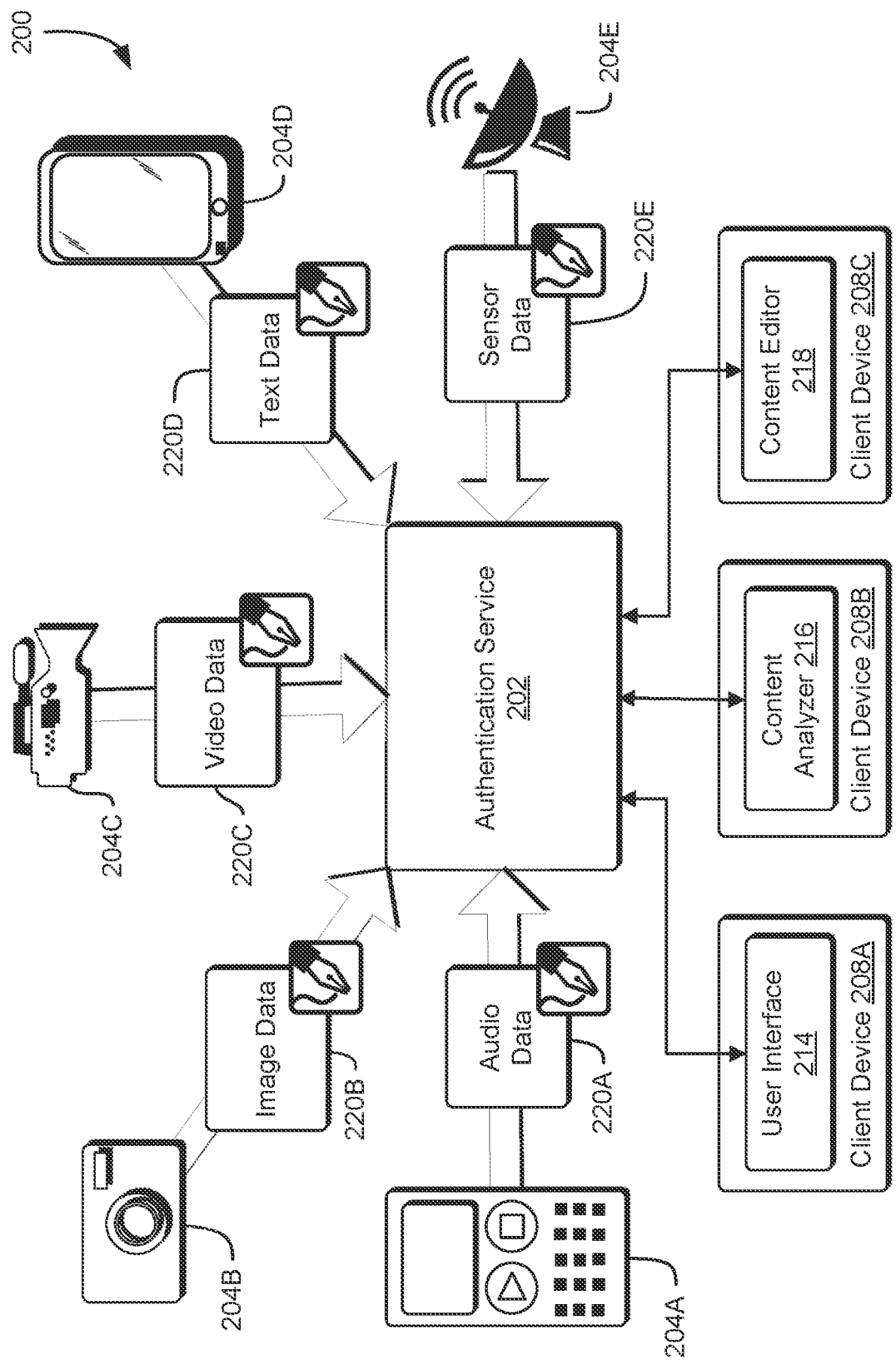
FIG. 2 shows an illustrative example of an environment in which a plurality of recording devices provide content for authentication in accordance with at least one embodiment.

FIG. 2 shows an illustrative example of an environment 200 in which a plurality of recording devices provide content for authentication in accordance with at least one embodiment. Authentication service 202 may be authentication service 102 of FIG. 1 in accordance with an embodiment. One of recording devices 204A-E may be recording device 104 of FIG. 1 in accordance with an embodiment. One of client devices 208A-C may be client device 108 of FIG. 1 in accordance with an embodiment.

In several embodiments, the environment 200 includes authentication service 202 interacting with several computing devices, such as recording devices 204A-E and client devices 208A-C. As illustrated therein, each of the recording devices 204A-E may submit their associated sensor data 220A-E, which may later then be distributed. For example, recording devices 204A-E may include: (1) a recording device 204A which may be an audio recording device that submits recorded audio data 220A to the authentication service 202; (2) a recording device 204B which may be a camera device that submits image data 220B to the authentication service 202; (3) a recording device 204C which may be a video camera device that submits video data 220C to the authentication service 202; (4) a recording device 204D which may be a document processing device that submits text data 220D to the authentication service 202; and (5) a recording device 204E which may be a sensor device that submits sensor data 220E to the authentication service 202. In several embodiments, the sensor data 220A-E may be digitally signed based at least in part by using cryptographic material stored in one or more secure modules associated with the recording devices 204A-E. In other embodiments, each of the sensor data 220A-E may also include one or more device identifiers corresponding to the recording devices 204A-E.

After the sensor data 220A-E are uploaded by the recording devices 204A-E, the authentication service 202 may determine authenticity of any distributed content associated with sensor data 220A-E. In one embodiment, the authentication service 202 may receive a request from the client devices 208A-C to authenticate distributed content associated with sensor data 220A-E. In some embodiments, the request may include the distributed content, a device identifier of the recording device that captured the content, a digital signature associated with the content, and/or a manifest that indicates one or more modifications that were applied to the original version of the content. By processing the data provided in the authentication request and comparing them against the uploaded sensor data 220A-E, the authentication service 602 may determine authenticity of the distributed content provided in the client devices 208A-C.

In some embodiments, the client devices 208A-C also include different software and/or hardware components associated with processing the distributed content corresponding to the sensor data 220A-E. For example, the client device 208A may include a user interface 214 which may be usable to display the distributed content, the client device 208B may include the content analyzer 216 which may be usable to determine authenticity of the distributed content based at least in part on information provided by the authentication service 202, and content editor 218 which may be usable to modify the information contained in the distributed content.

Figure 3:
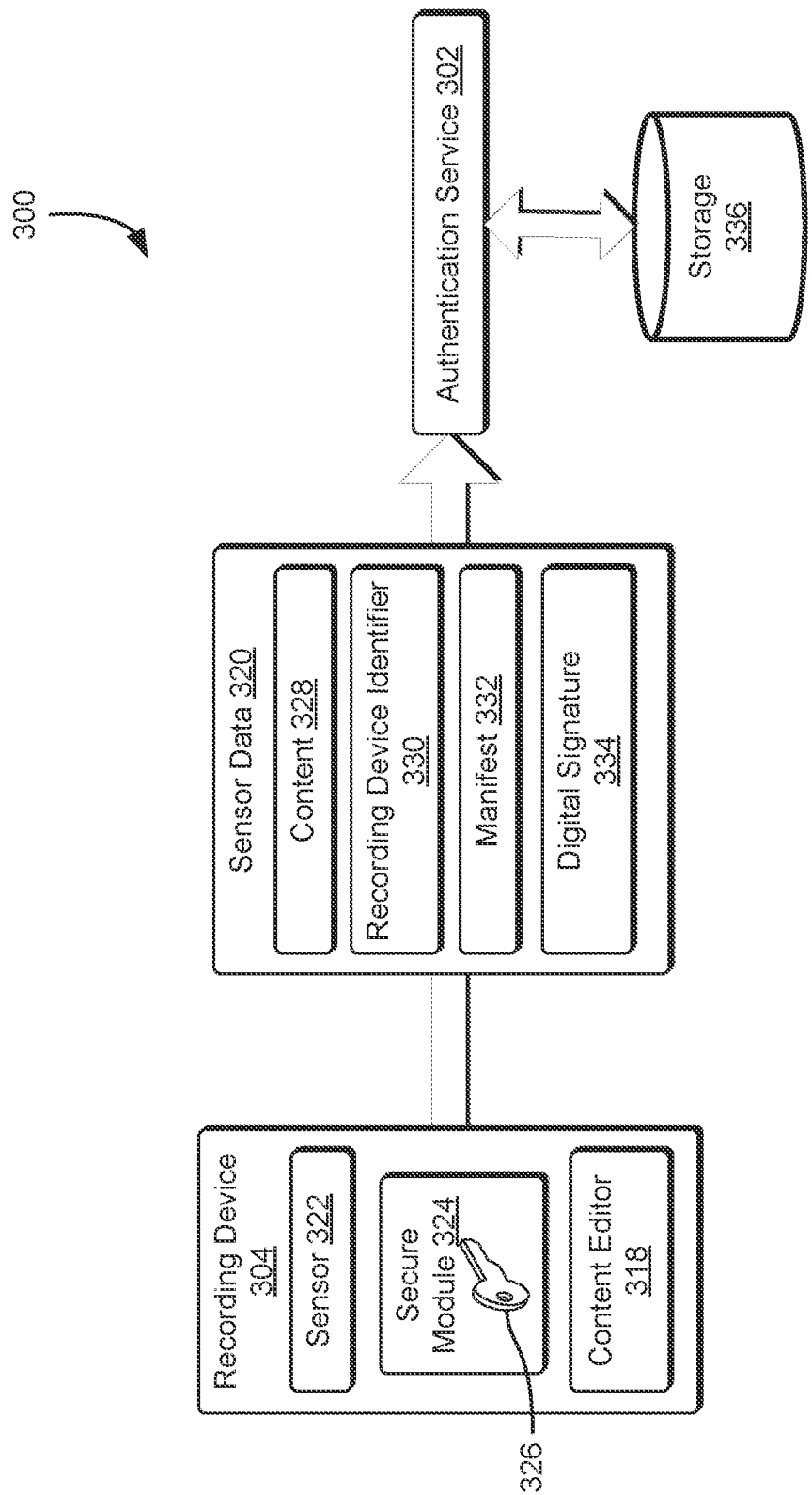
FIG. 3 shows an illustrative example of an environment in which a recording device generates content for authentication in accordance with at least one embodiment.

FIG. 3 shows an illustrative example of an environment 300 in which a recording device generates content for authentication in accordance with at least one embodiment. Authentication service 302 may be authentication service 202 of FIG. 2 in accordance with an embodiment. Recording device 304 may be one of recording devices 204A-E of FIG. 2 in accordance with an embodiment. Content editor 318 may be content editor 218 of FIG. 2 in accordance with an embodiment. Sensor data 320 may be one of sensor data 220A-E of FIG. 2 in accordance with an embodiment.

In several embodiments, the recording device 304 uses its sensor 322 to capture the content 328. In several embodiments, sensor 322 collects information about themselves and their surroundings and store the collected information within the recording device 304, which may then relay the collected information (i.e., content 328) to the authentication service 302. In some embodiments, sensor 322 may perform a specified function in response to control commands sent through the recording device 304. Various specific examples of information collected by the sensor 322 may include audio and images captured by the camera sensors attached to the recording device 304, in which a user interface associated with the recording device 304 may be usable to control several aspects of capture operations including the time in which content 328 needs to be captured. This may include a camera sensor generating one or more images, a video sensor recording a video scene, an audio sensor capture audio of the surroundings, a signal sensor detecting temperature sensors, and the like.

As the sensor 322 captures the content 328, the recording device 304 may generate a digital signature 334 of the content 328, which may include using a cryptographic key 326 stored in the secure module 324 to generate a digital signature of the content 328. In some embodiments, cryptographic key 326 stored in the secure module 324 is a private cryptographic key that cannot be accessed by other devices, or any other software or hardware components of the recording device that are not authorization for access. In this manner, it can be ascertained that the digital signature 334 of the captured content 328 remains authentic and incapable of manipulation by other devices or users that does not have any access. As referred herein, digital signature includes any information usable to cryptographically verify authenticity of content 328, including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted by secure module 324 so as to be decryptable by the system that will cryptographically verify the data object, where the ability to decrypt the data object serves as cryptographic verification of the data object. As another example, the data object may be digitally signed (thereby producing a digital signature of the data object) by secure module 324 such that the digital signature 334 is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable.

In some embodiments, a key 326 used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., recording device 304). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

As indicated above, the keys usable 326 to configure the digital signature 334 of content 328 may be stored in a secure module 324 of the recording device 304. The secure module 324, which may be a trusted platform module (TPM), may include a memory subsystem, including a main random access memory (RAM) for storage of instructions and data during program execution and a read only memory (ROM), in which fixed cryptographic information may be stored, such as a hardware secret stored securely within the recording device 304 so as to be non-exportable (i.e., inaccessible through any call to the cryptographic module). The secure module 324, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. Cryptographic keys may be stored in RAM and/or processor registers for temporary cryptographic processing. Secure module 324 may use the cryptographic information stored in memory in combination with cryptographic information obtained from one or more devices by connecting through the network (e.g., network 1504 of FIG. 15). Secure module 324 may include one or more cryptographic processors which may be used by secure module 324 to perform cryptographic operations for the recording device 304 and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the secure module 324 may collectively perform various operations used to generate cryptographically verifiable information for content 328 captured by the sensor data 320.

As noted above, in various embodiments of the present disclosure, hardware secrets are securely stored within the secure module 324. In some embodiments, the secure module 324 is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs may include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

In several embodiments, the recording device 304 may also include a content editor 318 which allows the captured content to be modified. In several embodiments, the content editor 318 may include an image processing software, audio editing software, video processing software, document processing software, and the like. In these embodiments, the modifications to the captured content 328 is performed by the content editor 318 after the digital signature 334 has been generated so that integrity of the content 328 is maintained. In some embodiments, the information indicative of each modification performed by the content editor 318 can be added into a manifest 332 associated with the content 328. As referred herein, a manifest 332 is a type of metadata appended or otherwise associated with the content 328, which may provide various types of information with regards to the content. For example, the manifest 332 may include information that may assist in identifying the original version of the content 328, as well as a history of modifications applied on the content. In some embodiments, the manifest 332 may include a modification path, which provides a sequence of modification claims that indicate the order in which the content was modified by the content editor 318. For example, if the content editor 318 reduced the size of an image object existing content, then inserted a second image object within the content, the manifest may include a first modification claim that provides "reduce object size" and a second modification claim that provides "insert image object from image database A." In several embodiments, the modification claims in the manifest 332 may include one or more algorithms and the software programs used to execute such algorithms, in which the one or more algorithms indicate the type of transformation of the content 328 in accordance with the corresponding modification claim. In other embodiments, the modification claims in the manifest 332 may include one or more computer functions (an actual implementation of the algorithms) which can be executed to cause the transformation of the content 328. In several embodiments, the manifest 332 may be embedded into metadata of the content 328, which may be formatted into Exchangeable image file format (EXIF) or other format (e.g., Extensible Metadata Platform (XMP)), in which the metadata may additionally store some or all of the following information data/time, camera settings (e.g., static data, such as camera model and make, and information that varies with each image such as orientation, aperture, shutter speed, focal length, metering mode, and ISO speed information), a thumbnail for previewing the picture, descriptions and copyright information, and/or other information.

After processing of the captured content 328 is complete, the recording device 304 may upload the sensor data 320 to the authentication service 302, in which the sensor data 320 may include the content 328, the recording device identifier 330, the manifest 332, and the digital signature 334. The authentication service 302 may obtain and store the sensor data 320 in order to enable authentication of any distributed content associated with the content 328 at a later time. In some embodiments, the authentication service 302 may store the sensor data 320 in storage 336 (e.g., data store 1510 of FIG. 15), in which the storage 336 may be a persistent storage that allows the information in the sensor data 320 to persist at least until it is determined that insufficient number of authentication requests has been occurring for a predetermined period of time.

Figure 4:
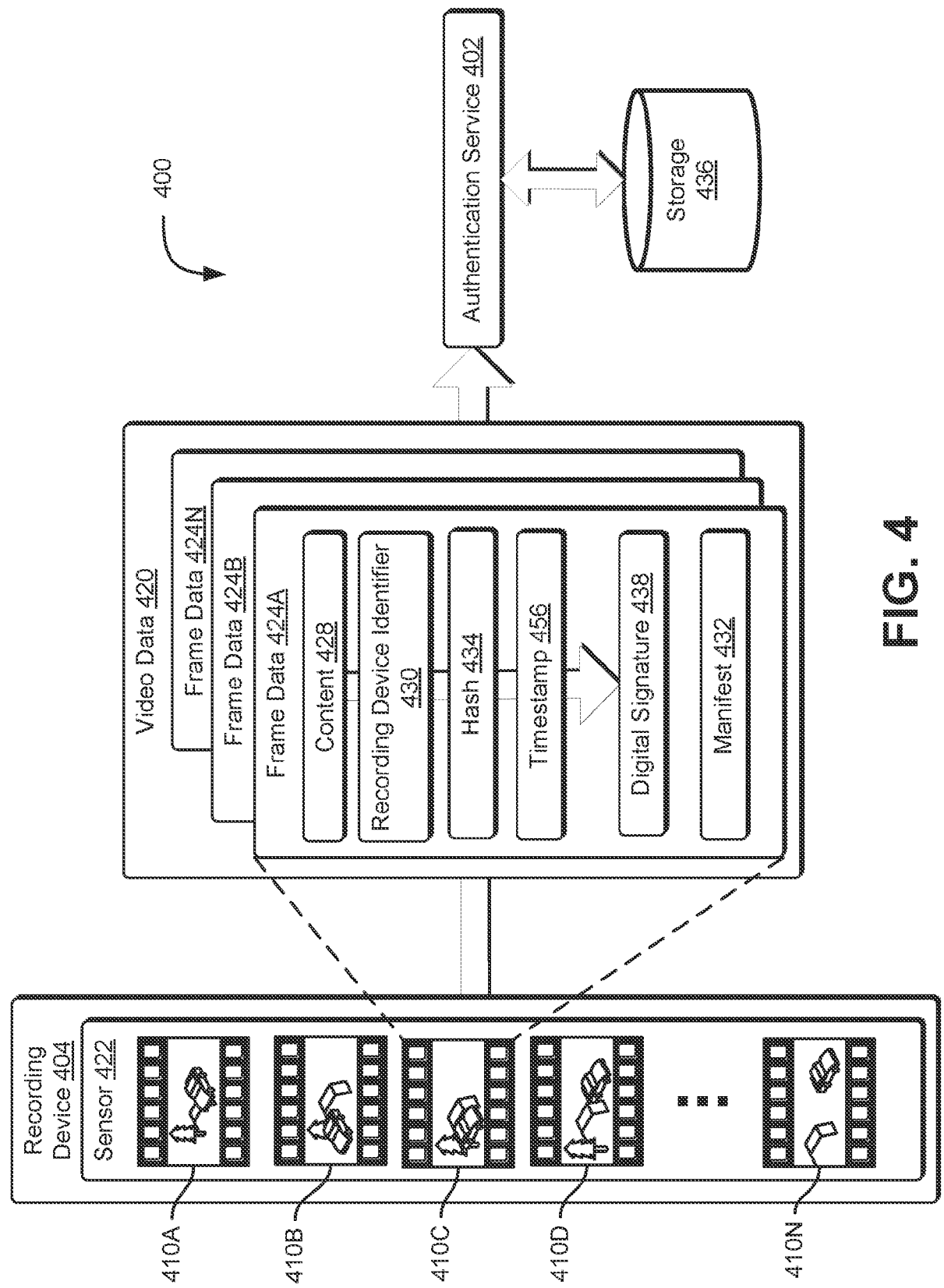
FIG. 4 shows an illustrative example of an environment in which the recording device generates video for authentication in accordance with at least one embodiment.

FIG. 4 shows an illustrative example of an environment 400 in which the recording device generates video for authentication in accordance with at least one embodiment. Authentication service 402 may be authentication service 202 of FIG. 2 in accordance with an embodiment. Recording device 404 may be one of recording devices 204A-E of FIG. 2. Sensor 422 may be sensor 322 of FIG. 3 in accordance with an embodiment. Content 428 may be content 328 of FIG. 3 in accordance with an embodiment. Recording device identifier 430 may be recording device identifier 430 of FIG. 3 in accordance with an embodiment. Manifest 432 may be manifest 332 of FIG. 3 in accordance with an embodiment. Digital signature 438 may be digital signature 334 of FIG. 3 in accordance with an embodiment.

In several embodiments, the recording device 404 uses its sensor 422 to capture a video that includes a plurality of video frames, such as video frames 410A-N. Each of video frames 410A-N may be associated with an image and an audio segment. As the sensor 422 captures the video, video data 420 may be determined for one or more corresponding video frames 410A-N. In several embodiments, the video data 420 may include a plurality of frame data 424A-N, which correspond to respective frame captured by the sensor 422. For example, frame data 424A may be associated with content in frame 410C, frame data 424B may be associated with frame 410D, and so forth.

In one embodiment, frame data 424A specifies one or more content properties associated with the corresponding video frame, e.g., frame 410C. As illustrated herein, frame data 424A includes content 428, hash 434, timestamp 456, recording device identifier 430, and manifest 432. For example, content 428 may include one or more rendered images associated with frame 410C and audio clips associated with the frame 410. In some embodiments, the content 428 may be uploaded to the authentication service 402 so as to allow the service to determine authenticity of distributed versions of the video captured by the recording device 404. As referred above, the manifest 432 may include information that may assist in identifying the original version of the content 428, as well as a history of modifications applied on the content, including modification paths.

Hash 434 may be a hash value of another frame associated with the content 428. For example, hash 434 may be a value derived from information associated with a previous frame (e.g., frame 410B) of the frame 410C, such as the image content of the previous frame. Other information used to generate the hash 434 may include metadata of the previous frame. In some examples, the hash 434 is generated based on another hash that is part of the metadata of the previous frame, where the other hash is generated based on content of yet another previous frame. In one example, the hash 434 is generated based on the content of the immediately preceding frame, although other embodiments may have intervening frames with content not used to generate the hash 434. Similarly, the hash 434 in some examples is generated based on content from multiple previous frames, such as a sequence of immediately preceding frames. As another example, the hash 434 may be a value derived from information associated with a subsequent frame (e.g., frame 410E) of the frame 410C. In one embodiment, the reference frame used to generate the hash 434 may be a frame that is captured and configured to be displayed immediately before the frame 410C. In this manner, each frame data representative of the frame may refer to a hash value of its previous frame, thereby creating a chain of hash values specifying an order in which the frames 410A-N of an authenticated video should be displayed on a client device. In one embodiment, hash 434 corresponding to the first frame of the video (e.g., frame 410A) can be assigned with a null value or any other suitable values that would indicated that frame 410A is configured to be the first frame of the video. In some embodiments, frame data 424A-N includes a timestamp 456 which specifies information as to when the frame 410C should be displayed relative to other frames in the video.

In several embodiments, information specified by the frame data 424A-N such as content 428, recording device identifier 430, hash 434, and timestamp 456 may be used as inputs to generate a digital signature 438 which indicates authenticity of both content of the video and ordering of the individual frames 410A-N of the video. In addition, a cryptographic key retrieved from a secure module (e.g., secure module 324 of FIG. 3) in the recording device 404 can also be used to generate the digital signature 438. In one embodiment, the digital signature 438 can be used by the authentication service 402 to determine the authenticity of content of the distributed version of the video. In addition, the digital signature 438 can also be used by the authentication service 402 that determine that frame 410C of the distributed version is in the correct position within the video. For example, the authentication service may determine whether the hash value corresponding to a frame of the distributed video matches the hash value corresponding to the frame of the original video. If they do not match, the authentication service 402 may generate a response to the client device (e.g., client device 208A of FIG. 2) that the distributed video cannot be authenticated due to disarrangement of the frames 410A-N in the video. The authentication service 402 may thus detect if one or more frames in the video have been added, removed, modified, or rearranged, which provides additional assurance of authenticity of distributed content. In other embodiments, multiple digital signatures may exist for each of the frames 410A-N in which a first digital signature may be used to authenticate the content, and a second digital signature may be used to authenticate the position of the frame within the video. In additional embodiments, the digital signature 438 may be used to generate the hash value for other frames of the video.

Figure 5:
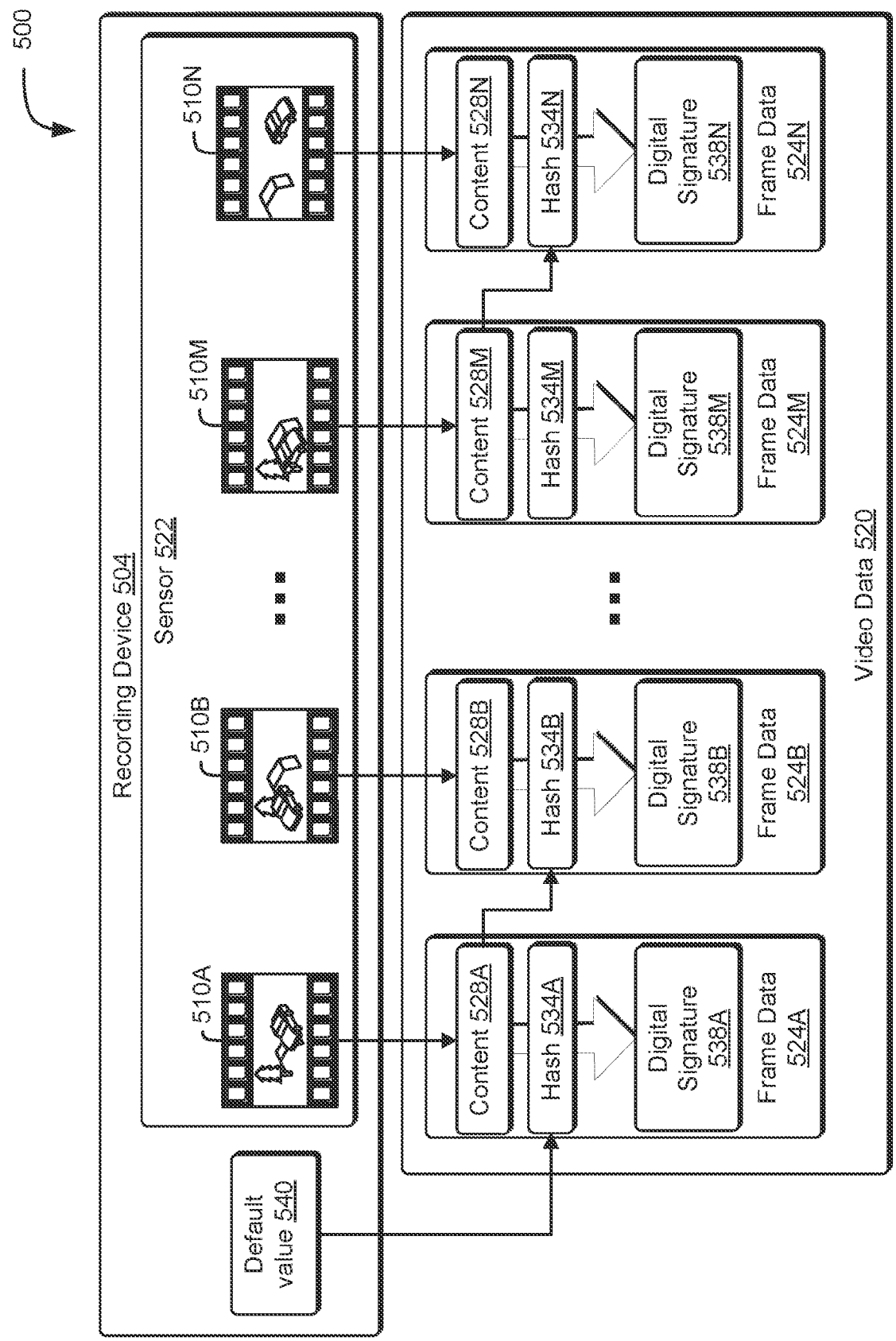
FIG. 5 shows an illustrative example of an environment in which the frames of a video can be authentication in accordance with at least one embodiment.

FIG. 5 shows an illustrative example of an environment 500 in which the frames of a video can be authentication in accordance with at least one embodiment. Recording device 504 may be one of recording devices 404 of FIG. 4 in accordance with an embodiment. Sensor 522 may be sensor 422 of FIG. 4 in accordance with an embodiment. One of contents 528 may be content 428 of FIG. 4 in accordance with an embodiment. Frames 510A-N may be frames 410A N of FIG. 4 in accordance with an embodiment. Frame data 524A-N may be frame data 424A-N of FIG. 4 in accordance with an embodiment. One of hash values 534A-N may be hash value 434 of FIG. 4 in accordance with an embodiment. One of digital signatures 538A-N may be digital signature s438 of FIG. 4 in accordance with an embodiment. Video data 520 may be video data 420 of FIG. 4 in accordance with an embodiment.

In accordance with several embodiments, frame data 524A-N indicates information that can be used to authenticate the content of the respective video frames 510A-N. In one embodiment, the digital signature 538A-N can be used by an authentication service to determine authenticity of the contents captured in the respective video frames 510A-N. For example, the digital signature 538A can indicate that one or more image objects appearing in the video frame 510A such as the tree and the car are not added or otherwise transformed by another user. In another embodiment, the digital signatures 538A-N can be used to determine authenticity of the ordering of the video frames 510A-N. By generating a hash value of the previous frame as input for generating the digital signature, the authentication service can later identify whether one or more frames of the frames 510A-N were rearranged, added, or removed. For example, the hash value 534B is a calculated hash value of the content 528A which represents video frame 510A. By using the hash value 534B and the content 528B, the digital signature 538B can be usable for validating: (1) the visual information captured by the content 528B; and (2) the frame 510A needs to be positioned before the frame 510B. By continuing the generation of digital signatures 538A-N, embodiments of the present disclosure generate a chain of frame data 524A-N that can be used for authentication of the proper arrangement of the video frames 510A-N as captured by the recording device 504.

In some embodiments, the recording device 504 uses a default value 540 to calculate the hash value 534 for the first video frame 510A. This is because the first video frame 510A does not have any reference frame that should be previously displayed. In one embodiment, the default value 540 may be a value that can be used to verify that the video frame 510A should be the first video frame that should be displayed.

Figure 6:
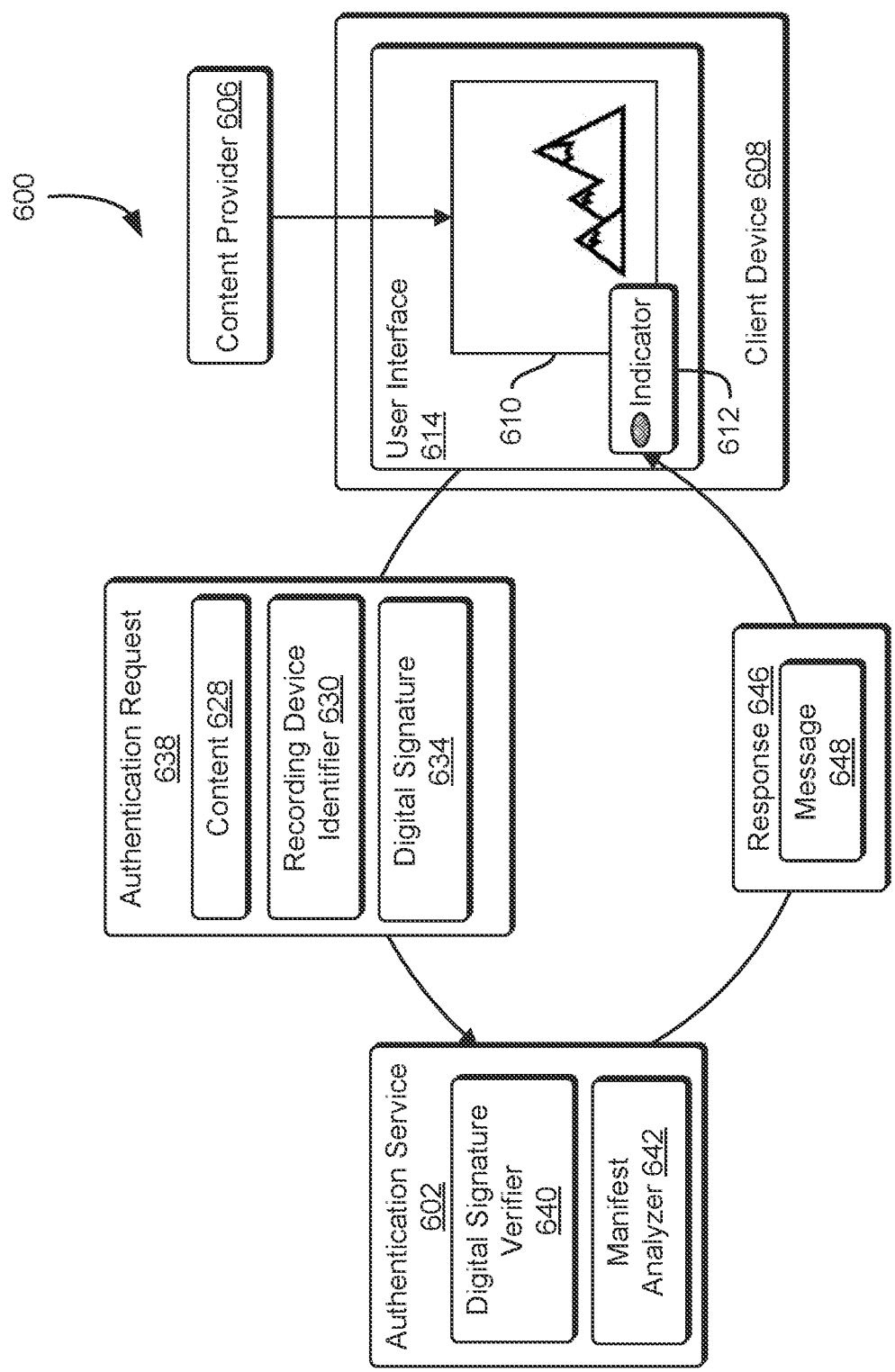
FIG. 6 shows an illustrative example of an environment in which authentication service determines authenticity of content in accordance with at least one embodiment.

FIG. 6 shows an illustrative example of an environment 600 in which authentication service determines authenticity of content in accordance with at least one embodiment. Authentication service 602 may be authentication service 302 of FIG. 3 in accordance with an embodiment. Device 608 may be one of client devices 108 of FIG. 1 in accordance with an embodiment. Indicator 612 may be indicator 112 of FIG. 1 in accordance with an embodiment. User interface 614 may be user interface 214 of FIG. 2 in accordance with an embodiment. Content 628 may be content 328 of FIG. 3 in accordance with an embodiment. Recording device identifier 630 may be recording device identifier 330 of FIG. 3 in accordance with an embodiment. Digital signature 634 may be digital signature 334 of FIG. 3 in accordance with an embodiment.

In several embodiments, the content provider 606 distributes content 610 to device 608, which causes the user interface 614 to display the content 610. In the event that the content 610 needs to be authenticated, the device 608 generates and transmits the authentication request 638 to authentication service 602. In some embodiments, the authentication request 638 includes content 628, recording device identifier 630, and digital signature 634. In one embodiment, content 628 includes the same data as content 610. In another embodiment, content 628 can be a hash of the content 610 in which the hash is generated by the device 608 displaying the content 610. The recording device identifier 630 may include one or more characters that identify the recording device that is associated with capturing the content 610. In some embodiments, the recording device identifier 630 may be a serial number of the recording device, or include alphanumeric characters that identify both the recording device and the manufacturer of the recording device. Digital signature 634 may be generated by a recording device as the content is captured. As indicated above, the cryptographic material (e.g., private cryptographic key) used to digitally sign the original version of the content can be stored in a secure module that is not accessible to other devices that receive the content, such as device 608. For embodiments in which the content 610 is video, the digital signature 634 may be generated for each frame of the video, in which the digital signature may be usable to determine authenticity of the content as well as the ordering of the frames within the video.

In response to obtaining the authentication request 638, the authentication service 602 may evaluate the content 628 and its associated digital signature 634, then provides a response 646 indicating whether the content 610 is authentic. In several embodiments, the authentication service 602 includes a digital signature verifier 640 and manifest analyzer 642. In one embodiment, the digital signature verifier 640 retrieves the digital signature 634. In several embodiments, the digital signature verifier 640 verify the digital signature 634 with a cryptographic material associated with the recording device that captured the content 610. In such embodiments, the cryptographic material used to verify the digital signature 634 can be a public cryptographic key that was previously distributed by the manufacturer of the recording device. In other implementations, the cryptographic material used to verify the digital signature 634 can be a public cryptographic key but was previously uploaded by the recording device.

Once the digital signature 634 is processed, the digital signature verifier 640 compares the digital signature 634 with the hash of the content 628. If it is determined that the content 628 is the same multimedia file as content 610, then the digital signature verifier 640 performs a one-way hash function on content 628 to generate the hash. If the digital signature verifier 640 determines that the hash of the content 628 matches the processed digital signature 634, the digital signature verifier 640 can generate a response 646 that includes a message 648 that the content 610 has been authenticated. Upon receiving the response 646, the device 608 may provide a visual indication (e.g., green light) on indicator 612 of the user interface 614. In this manner, the user of the device 608 can be assured that the content 610 has not been manipulated or edited before the content 610 is distributed.

On the contrary, if the digital signature verifier 640 determines that the hash of the content 628 does not the processed digital signature 634, the digital signature verifier 640 can generate a response 646 that includes a message 648 that the content 610 cannot be authenticated. In such cases, the device 608 may provide a different visual indication (e.g., red light) on indicator 612, alerting the user of the device 608 that information of the content 610 may have been compromised. In some embodiments, the message 648 in the response 646 may include additional information indicating why the authentication has failed. For example, the message 648 may indicate that hash of the content 628 does not match the digital signature 634. In another example, the message 648 may indicate that the digital signature 634 associated with the content 610 does not exist or rendered incapable of verification. In some implementations, the device 608 may ingest the message 648 and provide different visual indication (e.g., red light vs. orange light) depending on the information provided in the message 648. In examples in which the displayed content 610 is video, the message 648 may indicate that the frames of the video may have been rearranged or otherwise manipulated (even when the pixels rendered by the video frames remain unchanged).

Figure 7:
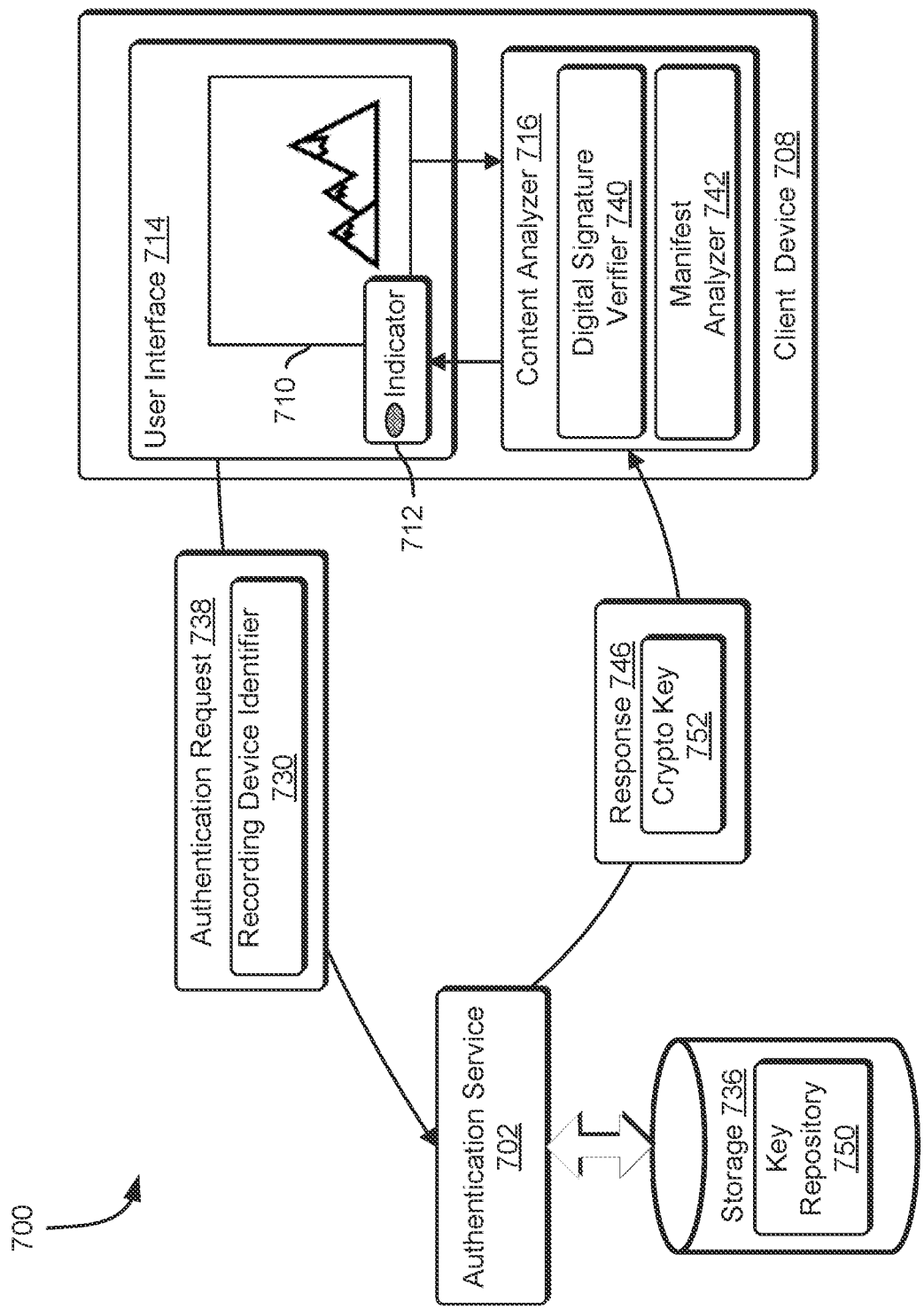
FIG. 7 shows an illustrative example of an environment in which authentication service provide cryptographic information usable to determine authenticity of content in accordance with at least one embodiment.

FIG. 7 shows an illustrative example of an environment 700 in which authentication service provide cryptographic information usable to determine authenticity of content in accordance with at least one embodiment. Authentication service 702 may be authentication service 602 of FIG. 6 in accordance with an embodiment. Recording device identifier 730 may be recording device identifier 630 of FIG. 6 in accordance with an embodiment. Authentication request 738 may be authentication request 638 of FIG. 6 in accordance with an embodiment. Content analyzer 716 may be content analyzer 216 of FIG. 2 in accordance with an embodiment. Response 746 may be response 646 of FIG. 6 in accordance with an embodiment.

In one embodiment, the device 708 may also generate an authentication request 738 to authenticate the content 710 being displayed on user interface 714. However, rather than allowing the authentication service 702 authenticating the content 710, this embodiment enables the device 708 to authenticate the content 710 itself. Accordingly, the authentication request 738 only includes the device identifier 730 of the recording device that captured the content 710. By providing only the recording device identifier 730 rather than the content itself, embodiments illustrated on FIG. 7 may be advantageous for situations in which network transmissions may be slow or sporadic that may hinder large amount of data to be transmitted to the authentication service 702.

In response to receiving the request 738, the authentication service 702 accesses the key repository 750 available in storage 736 and retrieves the cryptographic key 752 (e.g., public cryptographic key, symmetric key) necessary to authenticate the content 710. In several embodiments, the authentication service 702 uses the recording device identifier 730 in the authentication request 738 as part of a database query to retrieve the correct cryptographic material. Once the cryptographic key 752 has been obtained, the authentication service 702 generates a response 746 that includes the cryptographic key 752 and transmits the response 746 to the device 708. Unlike authentication 602 of FIG. 6, however, authentication service 702 does not provide an indication that the content 710 has been authenticated but rather provides sufficient information to allow the device itself to determine the authenticity of the content 710.

In one embodiment, the device 708 includes the content analyzer 716 (e.g., content analyzer 216 of FIG. 2) which obtains the response 746 and the associated cryptographic key 752 then performs one or more operations to determine authenticity of the content 710. In several embodiments, the content analyzer 716 includes digital signature verifier 740 and manifest analyzer 742. Similar to the respective component provided by authentication service 602, the digital signature verifier 740 retrieves the digital signature associated with the content 710. In some embodiments, the digital signature verifier 740 may process the digital signature of the content 710 using the cryptographic key 752. Thereafter, the digital signature verifier 740 obtains the content 710, generates the hash of the content 710, and compares the hash with the processed information from the digital signature. The results generated by the digital signature verifier 740 can be displayed on the indicator 712 of the user interface 714. For instance, a "green light" on the indicator 712 indicate that the content 710 has been successfully authenticated by the content analyzer 716. In another instance, a "yellow light" on the indicator 712 may indicate that there is insufficient information that allows the content analyzer 716 to authenticate the content 710. In such cases, the insufficient information may include the content analyzer 716 not receiving the cryptographic key 752 in the response 746, or that a digital signature associated with the content 710 does not exist. In yet another instance, a "red light" on the indicator 712 may indicate that the content 710 cannot be authenticated because the hash of the content 710 does not match the processed digital signature of the content 710. Nonetheless, one ordinarily skill in the art will appreciate that the embodiments are not limited to specific illustrations above, but also encompass other types of indicators including sound alerts, different colors, text notifications, or others, each of which can be embedded in user interface 714 or displayed as a pop-up alert.

Figure 8:
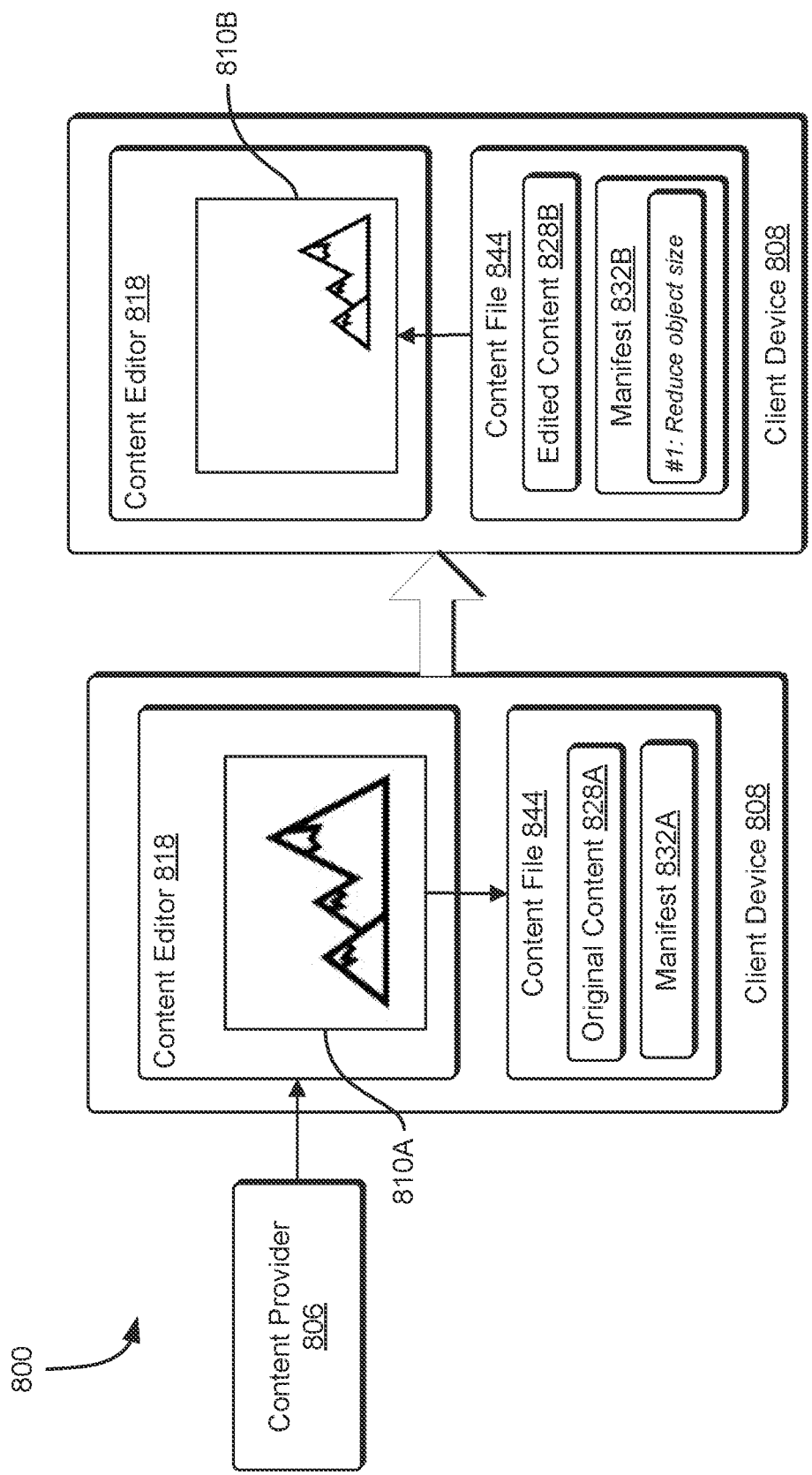
FIG. 8 shows an illustrative example of an environment in which manifest associated with transformed content is updated in accordance with at least one embodiment.

FIG. 8 shows an illustrative example of an environment 800 in which a manifest associated with transformed content is updated in accordance with at least one embodiment. Content provider 806 may be content provider 106 of FIG. 1 in accordance with an embodiment. Device 808 may be client device 108 of FIG. 1 in accordance with an embodiment. Content 810A-B may be content 110 of FIG. 1 in accordance with an embodiment. Content editor 818 may be content editor 218 of FIG. 2 in accordance with an embodiment. Manifest 832A-B may be manifest 332 of FIG. 3 in accordance with an embodiment.

In one embodiment, the device 808 obtains the content 810A from the content provider 806, in which the content 810A may be an original version as captured by the recording device. As the content 810A is received by the device 808, a user interface (e.g., user interface 214 of FIG. 2) may display the content 810A. In some embodiments, the device 808 may communicate with an authentication service (not shown in FIG. 8) to verify authenticity of the content 810A. In addition, the device 808 may include a content editor 818 in which the content 810A can be modified in various manners. For example, the content editor 818 may compress the content 810A to allow easier transmission to another device or a computer resource service provider. As illustrated in FIG. 8, the content editor 818 obtains the content file 844 which may include the content 828A and the manifest 832A associated with the original content 828A. In several embodiments, the manifest 832A indicates a series of algorithms that are used to edit the original content 828A. In some embodiments, the content editor 818 may generate the manifest 832A if manifest associated with original content 828A is not identified. In this example, the content editor 818 may not edit the original content 828A, but only generate the manifest 832A which can then be associated accordingly.

Afterwards, the content editor 818 may initiate modifying the visual properties of the original content 828A to produce edited content 828B. In this example, the content editor 818 modified the original content 828A by reducing a size of the image object depicted in the original content 828A. In accordance with the embodiments, such modification causes the manifest 832A to be updated, forming manifest 832B. In several embodiments, the manifest 832B includes a first modification claim of the manifest path which identifies the type of modification that had taken place: "reduce object size." In some embodiments, the first modification claim may also include a type of algorithm or computer function used to reduce the object size, including the input parameters associated with such algorithm, as well as the version and name of the content editor 818. Once the first modification claim is updated and stored, the content file 844 with edited content 828B can be saved then displayed as content 810B.

Figure 9:
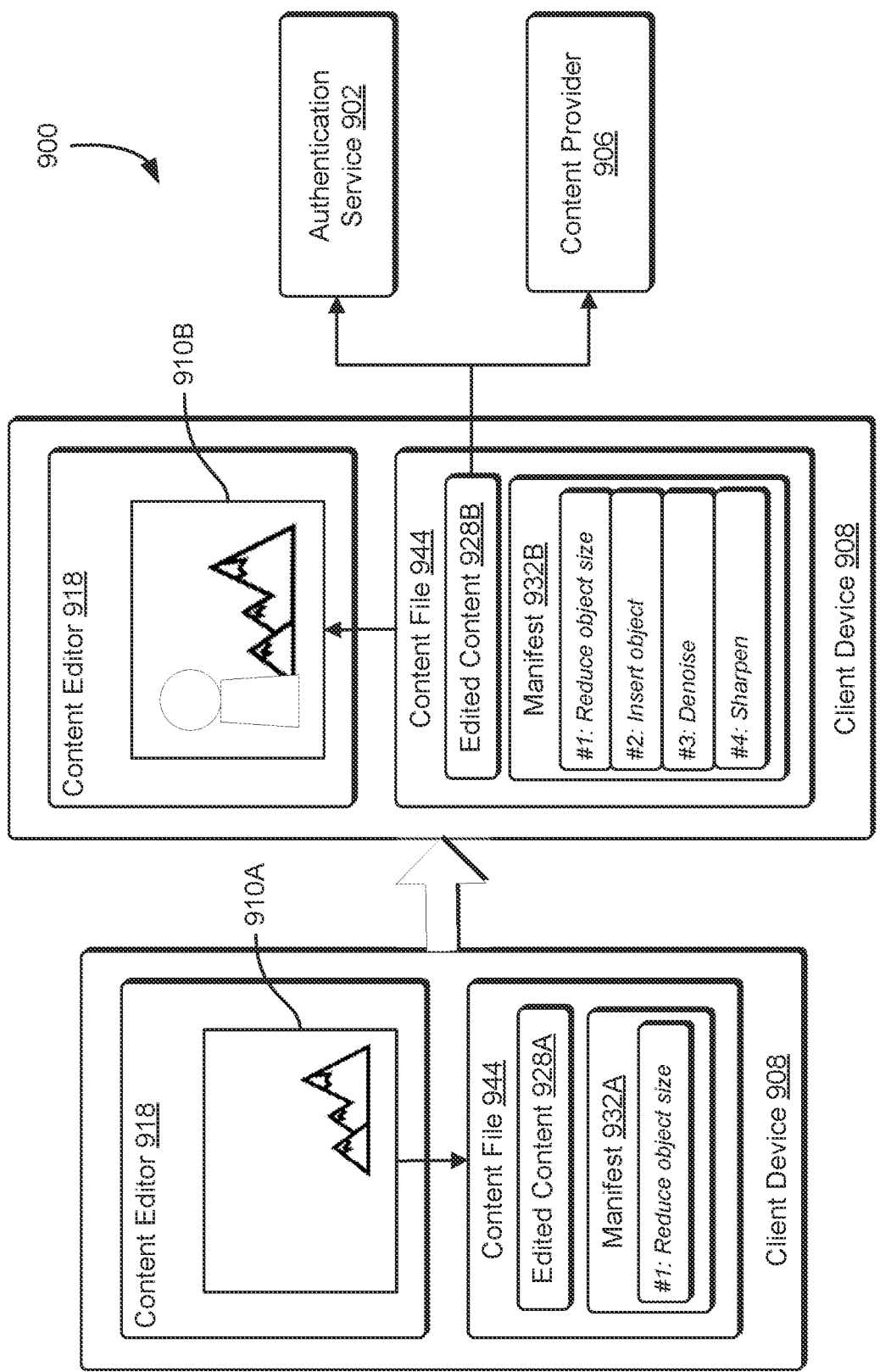
FIG. 9 shows an illustrative example of an environment in which manifest associated with transformed content is continuously updated in accordance with at least one embodiment.

FIG. 9 shows an illustrative example of an environment 900 in which manifest associated with transformed content is continuously updated in accordance with at least one embodiment. Authentication service 902 may be authentication service 702 of FIG. 7 in accordance with an embodiment. Content provider 906 may be content provider 806 of FIG. 8 in accordance with an embodiment. Device 908 may be device 808 of FIG. 8 in accordance with an embodiment. Content 910A-B may be content 810A-B of FIG. 8 in accordance with an embodiment. Content editor 918 may be content editor 818 of FIG. 8 in accordance with an embodiment. Manifest 932A-B may be manifest 832A-B of FIG. 8 in accordance with an embodiment. Content file 944 may be content file 844 of FIG. 8 in accordance with an embodiment.

In one embodiment, the device 908 may obtain a distributed version of the content, which can be content 910A. As indicated by the manifest 932A, the content 910A (or otherwise edited content 928A) is not an original version of the content as captured by the recording device, but rather a modified version in which the image object has been reduced to a different size. Similar to the embodiments illustrated in FIG. 8, the content editor 918 may further transform the content 910A by performing additional modifications to the content file 944 containing the edited content 928A. For example, the content editor 918 may insert a new image object into the content, remove any noise existing in the content, and sharpen the outlines of the image objects depicted in the content. These modifications may cause the manifest 932B to be updated, which include a second, third, and fourth modification claims in the manifest path in addition to the first modification claim. In several embodiments, the modification claims are added into the manifest path in the order that the operations were performed. For instance, the "insert object" claim occurred before than the "sharpen" claim in the manifest path. In some embodiments, each of the modifications may have been performed by the same software program, such as content editor 918. In other embodiments, each modification of the manifest path may have been caused by different types and versions of content editing programs, at which the modification claim may include the appropriate algorithm, including its input parameters, and the type and version of the software program used to cause such modification.

The edited content 928B may then be provided for display (e.g., user interface 214 of FIG. 2). As illustrated in FIG. 9, the content 910B is different from content 910A in that the other image object has been added into the content 910B. Although not apparent, the content 910B may include a different image resolution from the content 910A, as a result of denoise and sharpen functions applied to the content 910A by the content editor 918. Once the modifications are completed, the device 908 may upload the content 910B to authentication service 902 and/or content provider 906. In several embodiments, the manifest 932B is also updated to authentication service 902 and/or content provider 906 to allow authentication service 902 to authenticate the changes made to the original content. In other embodiments, the content 910B and manifest 932B may be distributed to other devices, at which the other devices may either further modify the content 910B or submit requests to the authentication service 920 to verify whether the modifications can be authenticated.

Figure 10:
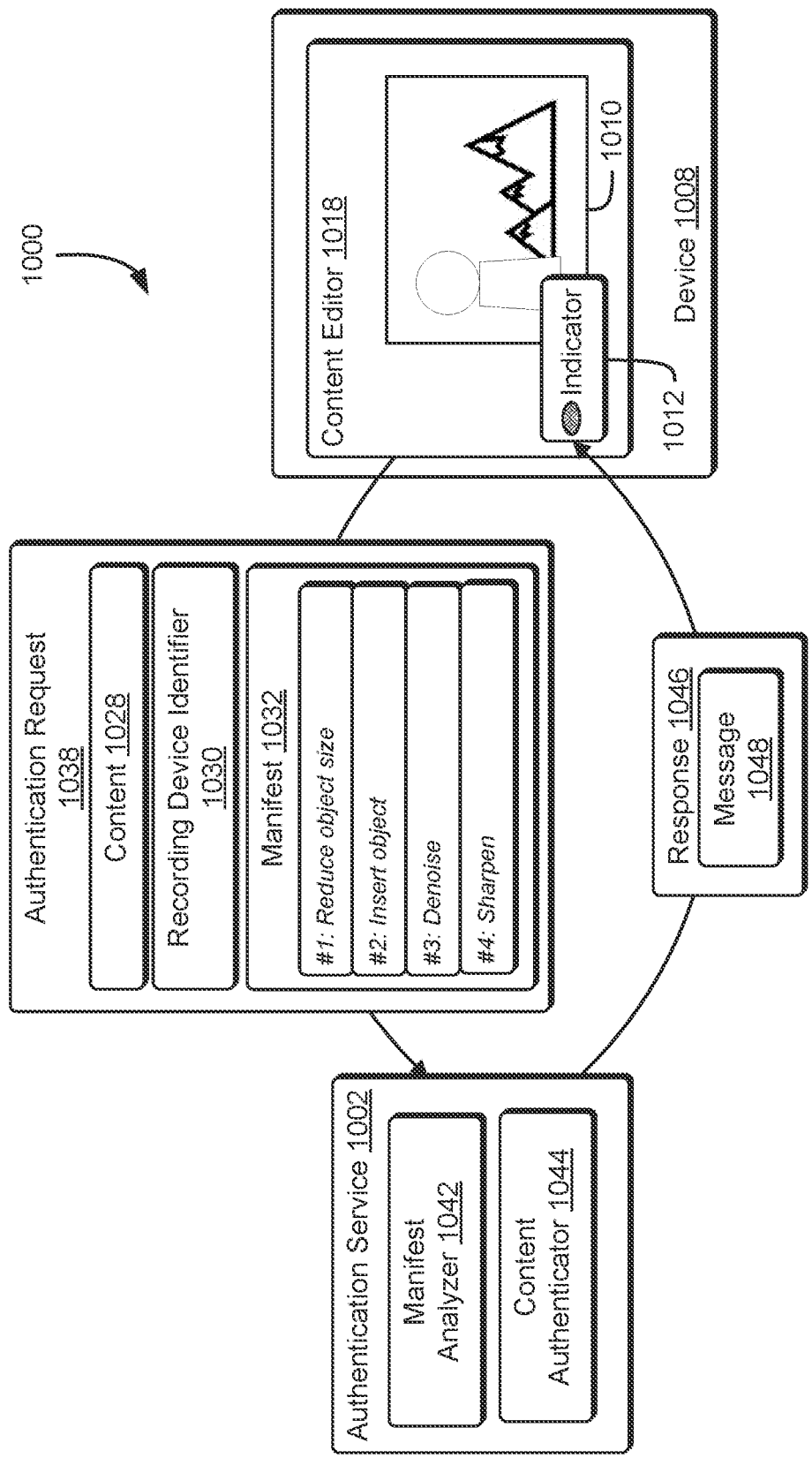
FIG. 10 shows an illustrative example of an environment in which authentication service determines authenticity of transformed content in accordance with at least one embodiment.

FIG. 10 shows an illustrative example of an environment 1000 in which authentication service determines authenticity of transformed content in accordance with at least one embodiment. Authentication service 1002 may be authentication service 902 of FIG. 9 in accordance with an embodiment. Device 1008 may be device 908 of FIG. 9 in accordance with an embodiment. Content 1010 may be one of content 910A-B of FIG. 9 in accordance with an embodiment. User interface 1014 may be user interface 914 of FIG. 9 in accordance with an embodiment. Content 1028 may be one of content 928A-B of FIG. 7 in accordance with an embodiment. Manifest 1032 may be one of manifest 932A-B of FIG. 9 in accordance with an embodiment. Manifest analyzer 1042 may be manifest analyzer 642 of FIG. 6 in accordance with an embodiment. Response 1046 may be response 646 of FIG. 6 in accordance with an embodiment. Message 1048 may be message 648 of FIG. 6 in accordance with an embodiment. Recording device identifier 1030 may be recording device identifier 630 of FIG. 6 in accordance with an embodiment.

After the distributed content 1010 is obtained (such as from content provider 906 or another device), the user of the device 1008 may submit an authentication request 1038 for authentication of the content 1010 that is being displayed on the user interface 1014. In some embodiments, the authentication request 1038 may include the distributed content 1028 (which is equivalent to content 1010), the device identifier 1030 associated with the recording device that captured the original content, and the manifest 1032 that indicates one or more modifications that produced the content 1028. As illustrated above, the manifest 1032 may include a manifest path that includes a series of modifications that indicate the type of algorithms or computer functions that were successively applied to the original version of the content. In some embodiments, the modification claims indicated in the manifest 1032 provide an order in which the functions were applied to generate the content 1028.

The authentication service 1002 may obtain the authentication request 1038 from the device 1008. In several embodiments, the authentication service 1002 includes manifest analyzer 1042 and content authenticator 1044, both of which are configured to process the authentication request 1038 and authenticate the content 1028. In one embodiment, manifest analyzer 1042 receives the manifest 1032 associated with the content 1028 and uses the information provided the manifest 1032 (e.g., information identifying the original version of the content) and/or recording device identifier 1030 to retrieve the original version of the content. After the original version of the content is retrieved, the manifest analyzer may apply the modification claims indicated in the manifest 1032 to the original content. In some embodiments, the applications of the modification claims may include executing the software programs that were indicated by each modification claim and executed the algorithm as described in such modification claim. For example, the manifest analyzer 1042 may execute the algorithm "reduce object size" to be applied against the original content, the algorithm executed by a content editing software program indicated in the modification claim. As illustrated above, the manifest analyzer 1042 applies every modification claim in the manifest 1032 to the original content, forming the transformed original content. Once the process is complete, the manifest analyzer 1042 provides the transformed original content to the content authenticator 1044.

In several embodiments, the content authenticator 1044 obtains the transformed original content from the manifest analyzer 1042, then compares the transformed original content with the distributed content 1028. By comparing these two content files, the authentication service 1002 may determine that the modifications made to the content 1028 are verifiable and can be authenticated. In some embodiments, however, authenticating the modified content does not necessarily indicate that the modified content is identical to the original content. Rather, by determining that the modifications are verifiable, the authentication service 1002 indicates that changes that caused the generation of the content 1028 are accurate and can be tracked. In some embodiments, the content authenticator 1044 compares the transformed original content and the distributed content 1028 based on comparing pixel data associated with such contents. For example, the content authenticator 1044 extracts RGB values or hex values associated with a particular pixel element of the transformed original content and determines whether such values match the values associated with corresponding pixel element of the distributed content 1028. In another embodiment, the content authenticator 1044 generates a hash for each of transformed original content and the distributed content 1028 then determines whether these hashes match. In yet another embodiment, the content authenticator 1044 determines whether the transformed original content and the distributed content 1028 are binary equivalents of each other.

Based on the results of the comparison as indicated above, the authentication service 1002 may generate a response 1046 that indicates whether the content 1010 can be authenticated. As illustrated in the above embodiments, the response 1046 may cause a visual feedback to be provided via the indicator 1012. For example, the response 1046 indicating successful authentication may provide a green light, whereas the response 1046 indicating a failed authentication may provide a red light. In another embodiment, the response 1046 may include message 1048 which may provide additional information regarding the authentication of content 1010 and may further cause the indicator 1012 to provide a different feedback (e.g., yellow light, orange light, different audio alert). In some embodiments, the authentication service 1002 may enable the device 1008 to view the message 1048 so as to allow the device 1008 to determine one or more reasons that caused the authentication of content 1010 to fail.

Figure 11:
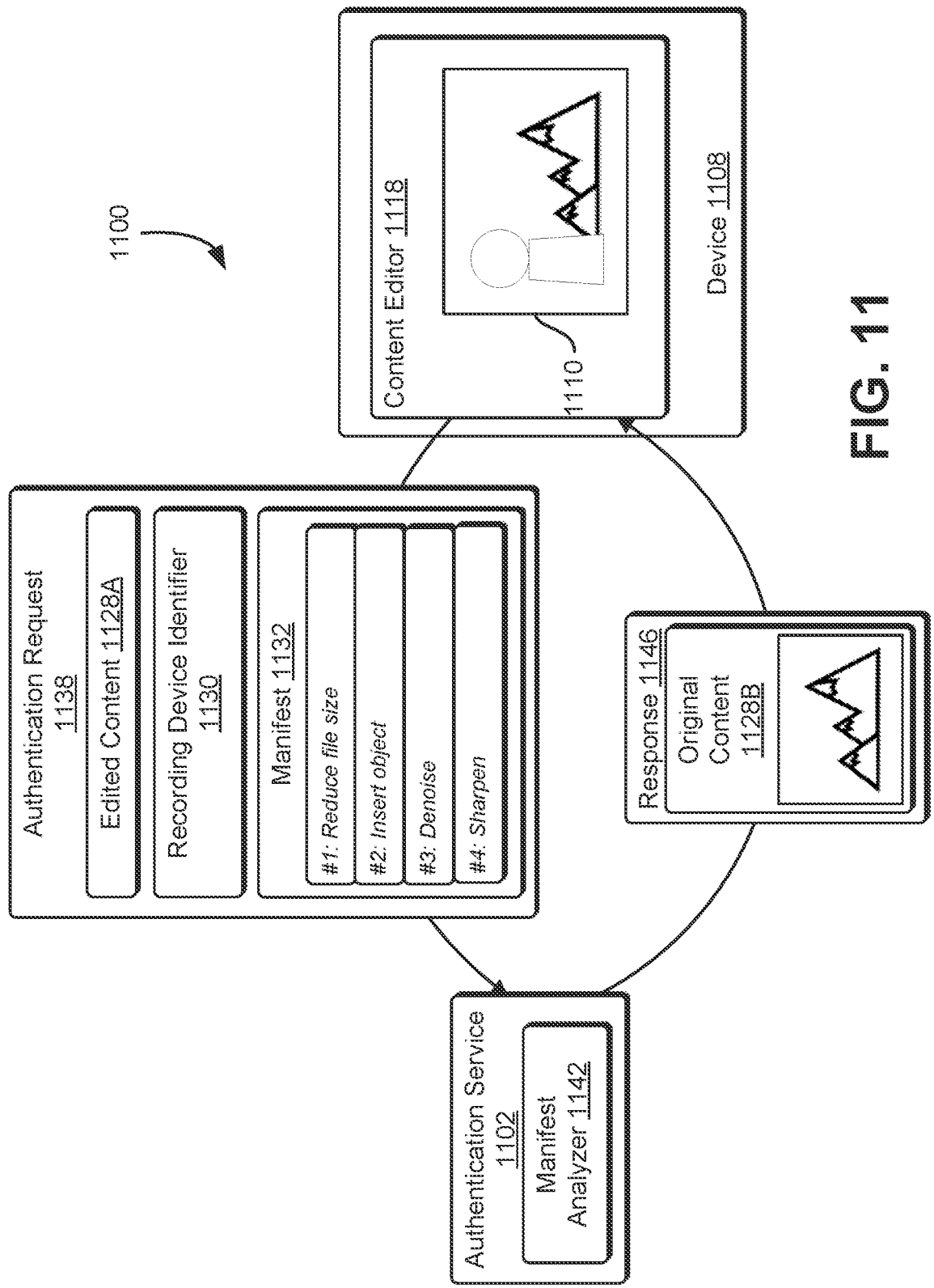
FIG. 11 shows an illustrative example of an environment in which authentication service provides information usable to determine authenticity of transformed content in accordance with at least one embodiment.

FIG. 11 shows an illustrative example of an environment 1100 in which authentication service provides information usable to determine authenticity of transformed content in accordance with at least one embodiment.

In several embodiments, the device 1108 submits an authentication request 1138 for determining authenticity of content 1110. Similar to the preceding embodiments, the authentication request 1138 may include one or more data elements, including edited content 1128A, the recording device identifier 1130, and the manifest 1132. The authentication service 1102, after obtaining the authentication request 1138, performs one or more processes to retrieve the original content 1128B. In some embodiments, the authentication service 1120 may include a manifest analyzer 1142 which may obtain the recording device identifier 1130 and retrieve the original version of the content which is identified by the same recording device identifier 1130.

After the original content 1128B is obtained, the authentication service 1102 provides the response 1146 back to the device 1108, in which the response 1146 includes the original content 1128B identified by the manifest analyzer 1142. In several embodiments, the device 1108 causes the original content 1128B and the content 1110 to be simultaneously displayed on the user interface 1114. This allows the user of the device 1108 to determine whether the original content 1128B and the content 1110 are the same. In this example, the original content 1128B and the content 1110 are different from each other in that the content 1110 includes another image object while the image object depicted in the original content 1128B has been transposed to another location. In this manner, the user of the device 1108 may determine that the content 1110 cannot be authenticated. In some embodiments, the authentication service 1102 performs the same process of determining authenticity of the content 1110 as illustrated in the processes disclosed in FIG. 10, but transmits the original content 1128B in the response 1146 after determining that the content 1110 cannot be authenticated. For example, the authentication service attempts to execute one or more computer functions indicated in the modification claims of the manifest 1132, but determines that one modification claim cannot be executed (e.g., image object associated with "insert object" cannot be identified). In such situation, the authentication service 1102 provides the response 1146 with the original content 1128B and may indicate in a message that authentication through manifest processing has failed.

Figure 12:
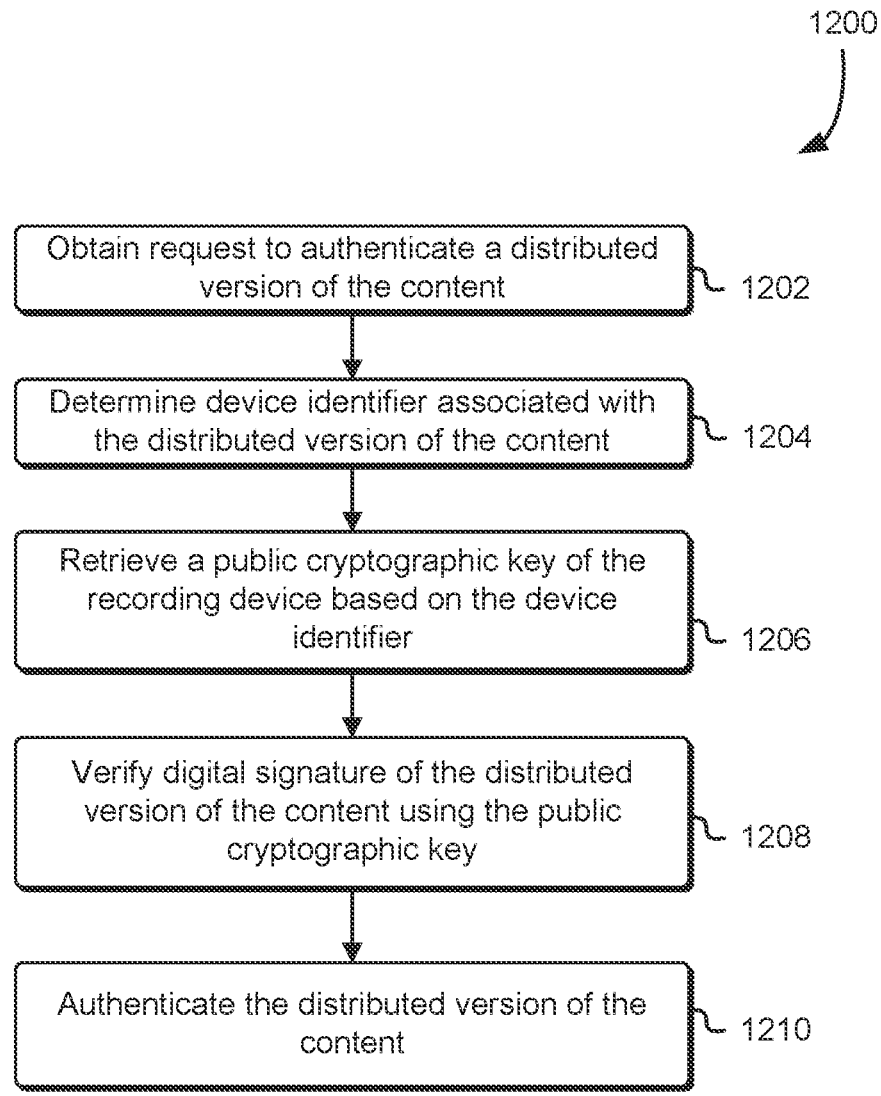
FIG. 12 shows an illustrative example of a process in which content is authenticated through its digital signature in accordance with at least one embodiment.

FIG. 12 shows an illustrative example of a process 1200 in which content is authenticated through its digital signature in accordance with at least one embodiment. At step 1202, an authentication service (e.g., authentication service 602 of FIG. 6) obtains a request (authentication request 638 of FIG. 6) to authenticate a distributed version of the content (e.g., content 628 of FIG. 6) which may be displayed on a user interface of a client device (e.g., device 608 of FIG. 6). In several embodiments, the request may include the content, a recording device identifier (e.g., recording device identifier 630 of FIG. 6), and a digital signature (digital signature 634 of FIG. 6), the identifier and digital signature associated with the content. In some embodiments, the digital signature may be generated with a private cryptographic key that is stored on a secure module of a recording device. In response to obtaining the request, the authentication service determines the recording device identifier associated with the distributed version of the content (step 1204).

At step 1206, the authentication service may retrieve a public cryptographic key of the recording device based on the determined recording device identifier. In several embodiments, the authentication service may access one or more key repositories to obtain the public cryptographic key associated with the recording device. In some embodiments, a manufacturing entity of the recording device publishes or otherwise distributes the public cryptographic keys to the authentication service. After retrieving the public cryptographic key, the authentication service verifies digital signature associated with the content by using the public cryptographic key (step 1208). For embodiments in which the content is a video, the authentication service may retrieve a plurality of digital signatures, each of which is associated with respective frames of the video. In these embodiments, the authentication service may use the digital signatures to not only determine authenticity of the content in each frame but also whether the frame is located in the correct ordering of the frames forming the video content. The authentication service may authenticate the distributed version of the content (step 1210). In several embodiments, the authentication may be performed by the authentication service generating a hash of the received content then comparing such hash with the digital signature. With video content, in some embodiments, hashes are generated successively, each from a previous frame as described above to enable authentication of multiple digital signatures where each digital signature depends from both a corresponding frame and previous frame. In an embodiment, process 1200 terminates thereafter.

Figure 13:
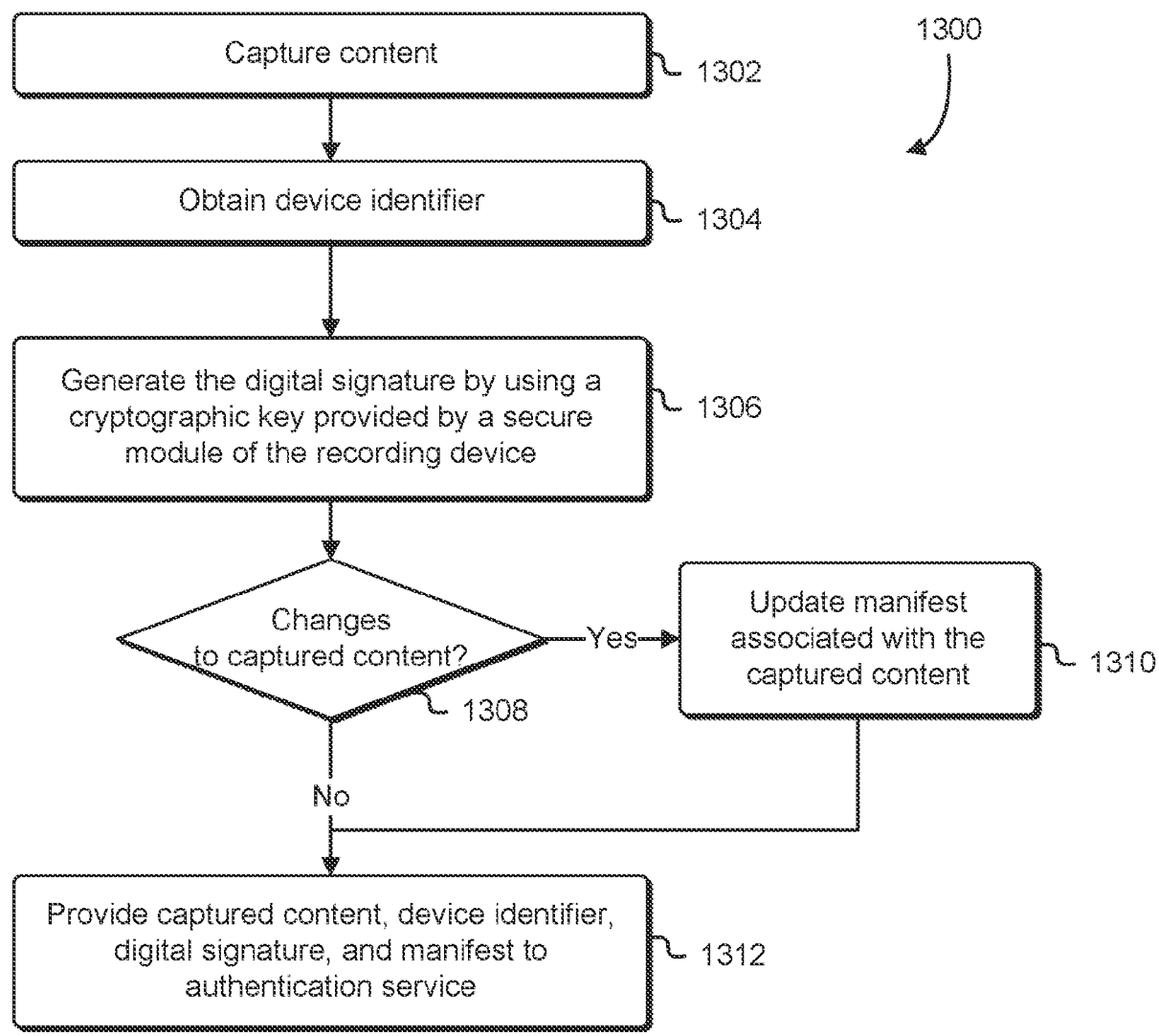
FIG. 13 shows an illustrative example of a process in which a recording device generates content for authentication in accordance with at least one embodiment.

FIG. 13 shows an illustrative example of a process 1300 in which a recording device generates content for authentication in accordance with at least one embodiment. At step 1302, a recording device (e.g., recording device 304 of FIG. 3) captures content. In several embodiments, the content may include, but not limited to, audio data (e.g., audio data 220A of FIG. 2), image data (e.g., image data 220B of FIG. 2), video data (e.g., video data 220C of FIG. 2), text data (e.g., text data 220D of FIG. 2), and/or sensor data (e.g., sensor data 220E of FIG. 2). In some embodiments, the content may include a combination of one or more of the foregoing. The recording device obtains its recording device identifier (step 1304).

At step 1306, the recording device generates a digital signature of the content by using a cryptographic key provided by a secure module of the recording device. In several embodiments, the secure module is a cryptoprocessor that is dedicated device located within the recording device, in which access to the cryptographic key may be restricted to the recording device that captures the content. In other embodiments, the secure module is a software component (e.g., firmware) that restricts access of cryptographic keys to devices that are external to the recording device. In some embodiments, the cryptographic key can be a private cryptographic key, at which the public cryptographic key is distributed to one or more authentication services. For embodiments in which the captured content is video, the recording device may generate the digital signature for each frame of the video, and, for each non-initial frame, the digital signature can be determined further based on a hash value of a reference frame (e.g., a previous frame). By using a hash value of the reference frame (which can be previous or subsequent frame), the digital signature can be further usable to determine the correct ordering of the frames in the video and also whether frames are missing or have been added.

At step 1308, the recording device determines if there are any changes to captured content. In several embodiments, changes to the content can be limited to changing file size (e.g., reduction of file size for faster transmission), changing file format, reducing noise, etc. In other embodiments, changes to content are more substantive, such as removing or adding image objects into the file, changing color scheme of the content, distorting audio content, etc. In some embodiments, the changes to the captured content can be performed by the recording device. If it is determined that there are changes to the content ("Yes" path of step 1308), the recording device updates a manifest associated with the captured content, identifying the types of changes applied to the content (step 1310). In some embodiments, the manifest is a separate file from the content file. In other embodiments, the manifest is a part of the content file, such as metadata or embedded data. After the manifest is updated or if it is determined that there are no changes to the captured content ("No" path of step 1308), the recording device provides the captured content, recording device identifier, digital signature, and manifest data (if any) to the authentication service (step 1312). Process 1300 terminates thereafter.

Figure 14:
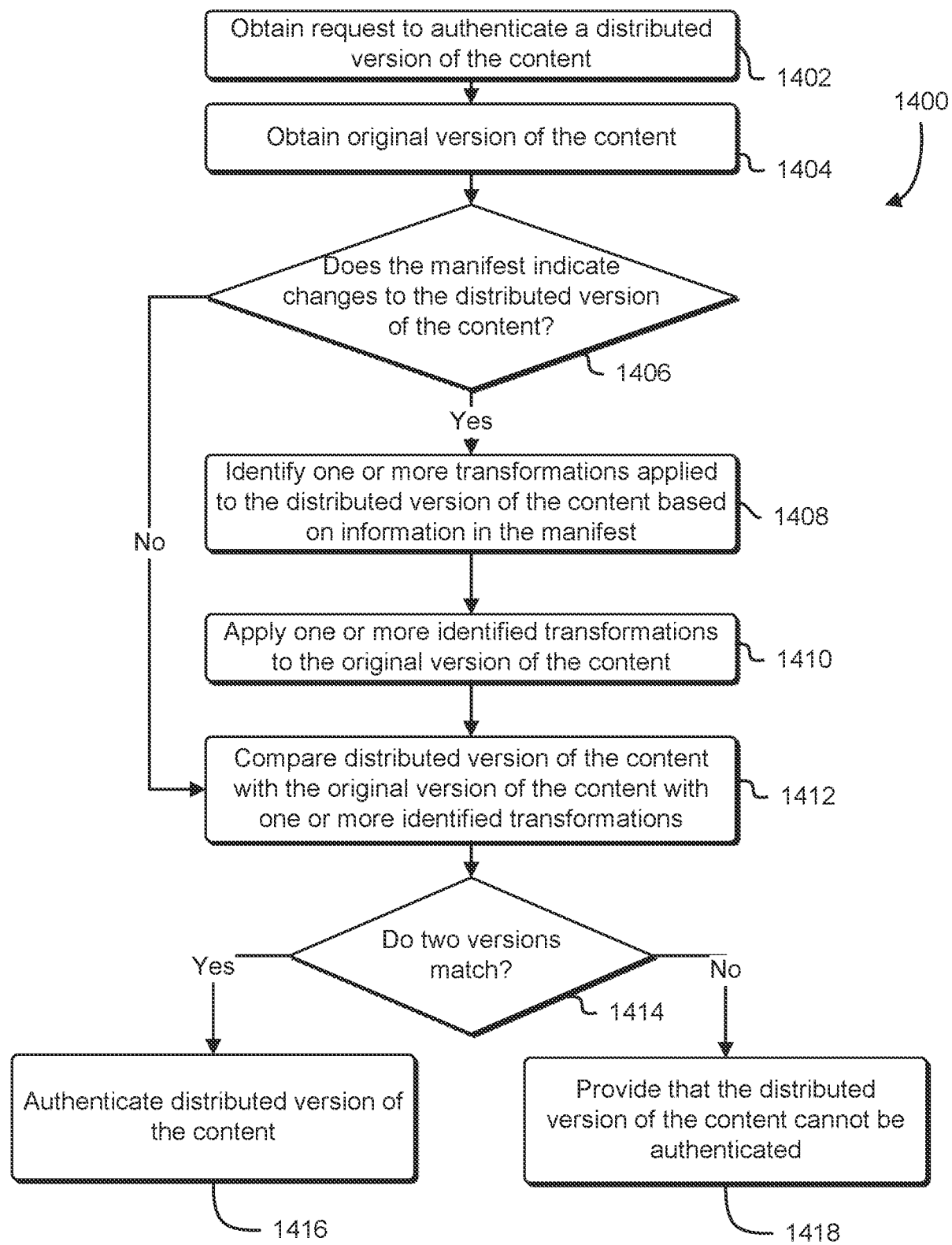
FIG. 14 shows an illustrative example of a process in which transformed content is authenticated based on information included in a corresponding manifest in accordance with at least one embodiment.

FIG. 14 shows an illustrative example of a process 1400 in which transformed content is authenticated based on information included in a corresponding manifest in accordance with at least one embodiment. At step 1402, the authentication service (e.g., authentication service 1002 of FIG. 10) obtains a request to authenticate a distributed version of the content. In some embodiments, the request may include the distributed content, a device identifier of the recording device that captured the content, and/or a manifest that identifies the original version of the content and indicates one or more modifications that were applied to the original version of the content. In one embodiment, the recording device identifier can also be included in the manifest to allow the manifest to be associated with the distributed version of the content. By using the information in the manifest, the authentication service obtains the original version of the content (step 1404). In some embodiments, the authentication service additionally uses the recording device identifier provided in the request in order to retrieve the original version of the content.

At step 1406, the authentication service determines whether the manifest includes information that indicate changes to the distributed version of the content. If it is determined that there manifest includes such information ("Yes" path of step 1406), the authentication service identifies one or more transformations indicated in the manifest that are applied to the distributed version of the content (step 1408). In some embodiments, the one or more transformations are depicted as a series of algorithms or functions that provide a path that caused the original content to be modified. In some embodiments, each transformation in the manifest indicates one or more functions that caused a computer operation to be performed in order to produce the distributed content. In additional embodiments, each transformation in the manifest identifies a software program and the version of the software program used to execute the algorithm reflected in the transformation. In yet another embodiment, each transformation in the manifest identifies input parameters used in modifying the content.

At step 1410, the authentication service applies the one or more transformations to the original version of the content. To maintain integrity and accuracy of such transformations, the authentication service may apply the transformations in the same order as indicated in the manifest associated with the distributed content. In some embodiments, the authentication service retrieves and utilizes the same version of the software program as indicated in each transformation of the manifest. In the event that one of the transformation in the modification path indicated in the manifest cannot be executed (e.g., the version of the software is not available, information in the transformation is invalid), the authentication service may bypass such transformation and record in a log identifying the transformation that failed to execute.

After all identified transformations are applied to the original version of the content, the authentication service compares the original content applied with transformations to the distributed content (step 1412). In some embodiments, the authentication services performs a pixel-by-pixel analysis of both contents for the comparison process. In other embodiments, the authentication services generates hash corresponding to each content then compares whether the values indicated in both content are the same. If it is determined that original version and distributed version of the content match ("Yes" path of step 1414), the authentication service verifies authenticity of the distributed version of the content (step 1416). In one embodiment, the authentication service provides such verification in response to the request and may provide the original content applied with the transformations to the users to allow the users to compare both versions. In such embodiment, both content can be displayed on a user interface (e.g., user interface 1014 of FIG. 10). Instead, if it is determined that the two versions to not match ("No" path of step 1414), the authentication service generates a response that the distributed version of the content cannot be authenticated (step 1418). In several embodiments, the authentication service may include a message in the response that indicates one or more reasons that may have caused failure of authentication. For example, if at least one transformation indicated in the manifest failed to execute, the authentication service may identify such transformation that has failed to execute. In another example, the authentication service may indicate that the manifest associated with the distributed content does not exist. Process 1400 terminates thereafter.

Figure 15:
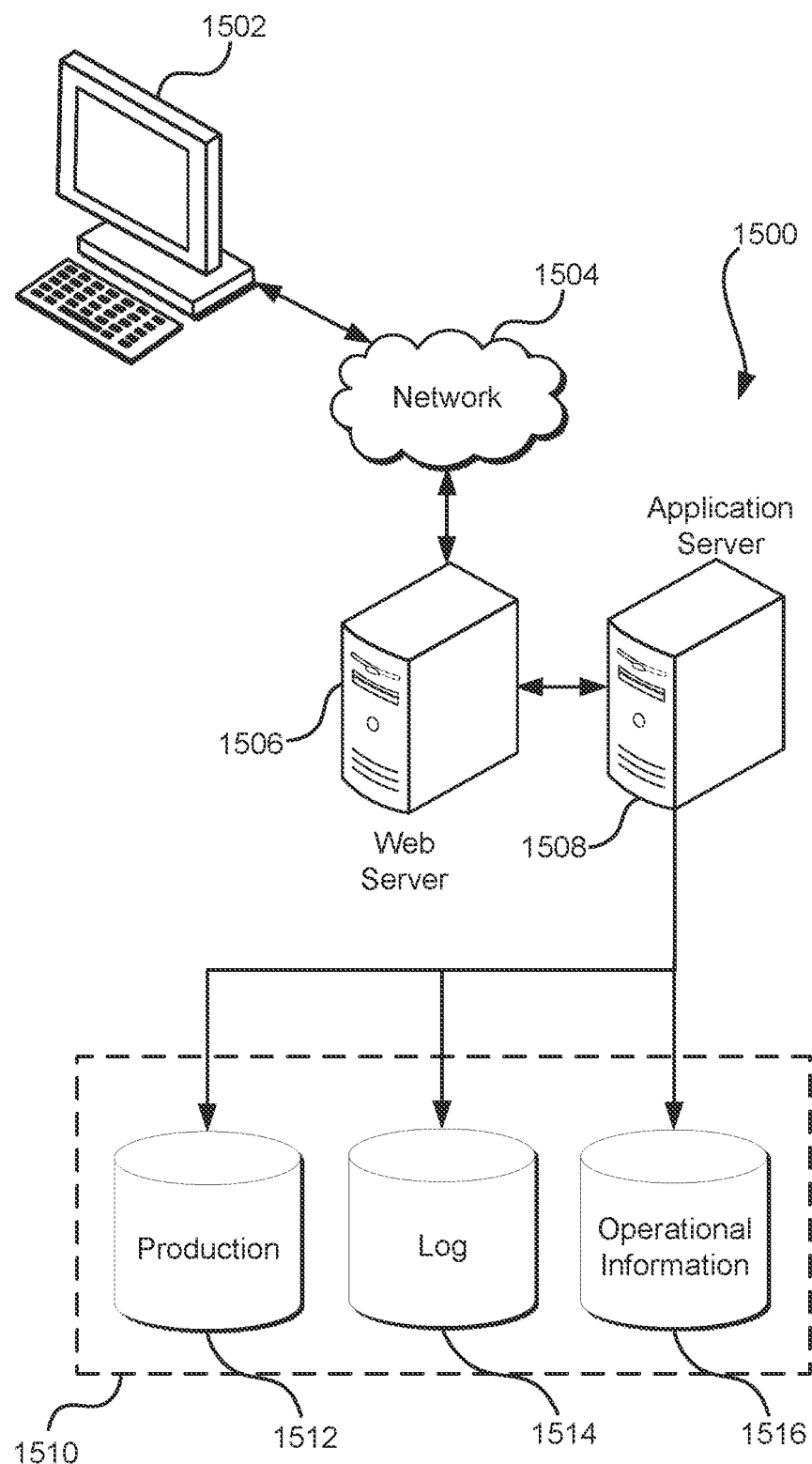
FIG. 15 illustrates a system in which various embodiments can be implemented.

FIG. 15 illustrates aspects of an example system 1500 for implementing aspects in accordance with an embodiment. As will be appreciated, although a web-based system is used for purposes of explanation, different systems may be used, as appropriate, to implement various embodiments. In an embodiment, the system includes an electronic client device 1502, which includes any appropriate device operable to send and/or receive requests, messages, or information over an appropriate network 1504 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1506 for receiving requests and serving content in response thereto, although for other networks an alternative device serving a similar purpose could be used as would be apparent to one of ordinary skill in the art.

In an embodiment, the illustrative system includes at least one application server 1508 and a data store 1510, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1502 and the application server 1508, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1510, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1512 and operational information 1516, which are used to serve content for the production side. The data store also is shown to include a mechanism for storing log data 1514, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1510.

The data store 1510, in an embodiment, is operable, through logic associated therewith, to receive instructions from the application server 1508 and obtain, update or otherwise process data in response thereto, and the application server 1508 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1502. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1500 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1500, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intetition to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors - for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system comprising:
   one or more processors; and
   memory storing computer-executable instructions that, if executed, cause the one or more processors to:
   obtain a video comprising a plurality of intermediate video frames with respective digital signatures, each video frame of the plurality of intermediate video frames associated with a respective digital signature, wherein the plurality of intermediate video frames form a chain of frames such that modification of an intermediate frame in the chain of frames is detectable based at least in part on an attempt to authenticate a digital signature of an adjacent frame to the intermediate frame, wherein:
  a previous video frame of the video includes an image; and
  the respective digital signature is generated based on:
    image content of the video frame;
    a hash value of an entirety of the image of the previous video frame; and
    a cryptographic key associated with a recording device used to capture the video;
use the respective digital signatures to verify, by at least authenticating the respective digital signatures of the plurality of intermediate video frames in the chain of frames, at least:
  image content of the intermediate video frames is unchanged; and
  an ordering of the intermediate video frames in the video is unchanged;
obtain metadata associated with the video frame, the metadata indicating one or more algorithms used to modify the image content of the video frame;
retrieve an unmodified version of the video frame;
apply the one or more algorithms to the unmodified version, wherein the one or more algorithms are used to modify content of the video frame; and
determine authenticity of the image content of the video frame based at least in part by comparing the image content of the video frame and image content of the unmodified version applied with the one or more algorithms.

2. The system of claim 1, wherein the cryptographic key is a private cryptographic key stored in a firmware embedded in the recording device.

3. The system of claim 1, further comprising computer-executable instructions that, if executed, cause the one or more processors to:
  obtain a public cryptographic key associated with the recording device; and
  verify the respective digital signatures by using the public cryptographic key.

4. The system of claim 1, wherein the each video frame of the plurality of intermediate video frames is associated with a respective manifest, the respective manifest including information that indicates one or more modifications applied to the image content of the each video frame.

5. The system of claim 1, further comprising computer-executable instructions that, if executed, cause the one or more processors to cause an interface of a client device to display one or more visual feedback indicating whether the video frame is authentic and in order relative to the previous video frame.

6. A computer-implemented method, comprising:
  obtaining video and a plurality of digital signatures, the video associated with a recording device, the video comprising a plurality of video frames, each video frame of the plurality of video frames associated with a respective digital signature, wherein the plurality of video frames form a chain of frames such that modification of an intermediate frame in the chain of frames is detectable based at least in part on an attempt to authenticate a digital signature of an adjacent frame to the intermediate frame, wherein:
    a previous video frame of the video includes an image; and
    the respective digital signature is based on:
      image content of the video frame;
      a hash value of an entirety of the image of the previous video frame; and
      a cryptographic key associated with the recording device;
  performing verifications of the plurality of video frames, using the plurality of digital signatures;
  indicating, based on the verifications, whether the digital signatures indicate authenticity of both content of the video and an ordering of individual frames of the video;
  obtaining metadata associated with the video frame, the metadata indicating one or more algorithms used to modify the content of the video frame;
  retrieving an unmodified version of the video frame;
  applying the one or more algorithms to the unmodified version; and
  determining authenticity of the image content of the video frame based at least in part by comparing the image content of the video frame and content of the unmodified version applied with the one or more algorithms.

7. The computer-implemented method of claim 6, wherein a digital signature of the plurality of digital signatures corresponds to a respective individual frame of the video.

8. The computer-implemented method of claim 7, wherein the digital signature is generated based at least in part on content of a previous frame relative to the respective individual frame of the video.

9. The computer-implemented method of claim 6, further comprising obtaining a manifest associated with the video, the manifest indicating a set of transformations applied to modify a respective individual frame of the video.

10. The computer-implemented method of claim 9, wherein the authenticity of the content of the video is further determined based at least in part on the manifest.

11. The computer-implemented method of claim 9, wherein the set of transformations indicates one or more algorithms that caused modifications to the content of the video.

12. The computer-implemented method of claim 11, wherein the set of transformations further indicates a version of computer executable code usable for executing the one or more algorithms.

13. The computer-implemented method of claim 12, further comprising determining the authenticity of the content of the video based at least in part on availability of the version of the computer executable code for retrieval.

14. A non-transitory computer-readable storage medium storing thereon executable instructions that, when executed by one or more processors of a computer system, cause the computer system to at least:
  obtain a video comprising a first frame and a second frame of a plurality of frames, the video being associated with a recording device, the first frame including an image, wherein the plurality of frames form a chain of frames such that modification of an intermediate frame in the chain of frames is detectable based at least in part on an attempt to authenticate a digital signature of an adjacent frame to the intermediate frame;
  calculate a hash of an entirety of the image;
  determine whether content of the second frame is authentic and whether the order of the second frame in the video is correct relative to the first frame using a digital signature associated with the second frame, the digital signature associated with the second frame based at least in part on:

the hash of the entirety of the image;

the content of the second frame; and a cryptographic key associated with the recording device;

indicate whether the second frame is authentic and in order relative to the first frame;

obtain metadata associated with the second frame, the metadata indicating one or more algorithms used to modify the content of the second frame;

retrieve an unmodified version of the second frame;

apply the one or more algorithms to the unmodified version; and determine authenticity of the content of the second frame based at least in part by comparing the content of the second frame and content of the unmodified version applied with the one or more algorithms.

15. The non-transitory computer-readable storage medium of claim 14, wherein the one or more algorithms include algorithms usable to add one or more images to the content of the second frame.

16. The non-transitory computer-readable storage medium of claim 14, wherein the first frame is configured to be displayed before the second frame.

17. The non-transitory computer-readable storage medium of claim 14, wherein the first frame is configured to be displayed after the second frame.

18. The non-transitory computer-readable storage medium of claim 14, wherein the executable instructions further comprise instructions that, as a result of being executed by the one or more processors, cause the computer system to cause a browser of a client device to display one or more visual feedback indicating whether the second frame is authentic and in order relative to the first frame.

19. The non-transitory computer-readable storage medium of claim 14, wherein the executable instructions further comprise instructions that, as a result of being executed by the one or more processors, cause the computer system to retrieve a cryptographic key to verify the digital signature, the cryptographic key retrieved based at least in part on a device identifier associated with the recording device.

20. The non-transitory computer-readable storage medium of claim 14, wherein each of the first frame and the second frame are associated with a respective manifest, the respective manifest including information that indicates one or more modifications applied to content of the first frame and the content of the second frame.

* * * * *